(12) United States Patent
Kuralenok

(10) Patent No.: US 10,353,974 B2
(45) Date of Patent: Jul. 16, 2019

(54) METHODS AND SYSTEMS FOR REFINING SEARCH RESULTS

(71) Applicant: YANDEX EUROPE AG, Lucerne (CH)

(72) Inventor: Igor Evgenyevich Kuralenok, Saint-Petersburg (RU)

(73) Assignee: YANDEX EUROPE AG, Lucerne (CH)

( * ) Notice: Subject to any disclaimer, the term of this patent is extended or adjusted under 35 U.S.C. 154(b) by 380 days.

(21) Appl. No.: 15/335,759

(22) Filed: Oct. 27, 2016

(65) Prior Publication Data

US 2017/0132323 A1 May 11, 2017

(30) Foreign Application Priority Data

Nov. 11, 2015 (RU) ................................ 2015148502

(51) Int. Cl.
*G06F 16/9535* (2019.01)
*G06F 16/248* (2019.01)

(52) U.S. Cl.
CPC ........ *G06F 16/9535* (2019.01); *G06F 16/248* (2019.01)

(58) Field of Classification Search
None
See application file for complete search history.

(56) References Cited

U.S. PATENT DOCUMENTS 7,072,888 B1 * 7/2006 Perkins ............. G06F 17/30867
707/733
7,801,885 B1 * 9/2010 Verma ............... G06F 17/30867
707/713
8,498,974 B1 * 7/2013 Kim .................. G06F 17/30867
707/706

(Continued)

FOREIGN PATENT DOCUMENTS

CN 102456018 A 5/2012
CN 104268142 A 1/2015
(Continued)

OTHER PUBLICATIONS

Search report from RU 2015148502 dated Apr. 12, 2017.
(Continued)

*Primary Examiner* — Christopher J Raab
(74) *Attorney, Agent, or Firm* — BCF LLP

(57) ABSTRACT

There are provided methods and systems for generating a refined search engine results page (SERP) for a search query received from a user. A search query result set is generated in response to the search query and displayed to the user on a SERP. A user interest parameter for a search result element is generated based at least in part on user interaction with the search result element on the SERP, based on summing a first and second weight for the search result element on a first and second search result, respectively. A second search query including the initial search query, the search result element, and the user interest parameter as a reformulation of the initial search query indicating significance of the search result element is generated, and the search query results generated in response to the second search query are displayed to the user, thereby generating the refined SERP.

14 Claims, 6 Drawing Sheets

(56) References Cited

U.S. PATENT DOCUMENTS

| | | |
|---|---|---|
| 8,620,891 B1 | 12/2013 | Thirumalai |
| 8,762,373 B1 | 6/2014 | Zamir et al. |
| 8,832,083 B1 | 9/2014 | Chen et al. |
| 8,938,463 B1 | 1/2015 | Kim et al. |
| 2006/0136377 A1 | 6/2006 | Patt-Shamir et al. |
| 2007/0276807 A1 | 11/2007 | Chen et al. |
| 2008/0065762 A1 | 3/2008 | Nauerz et al. |
| 2008/0281809 A1* | 11/2008 | Anderson ......... G06F 17/30867 |
| 2009/0119278 A1 | 5/2009 | Cross et al. |
| 2009/0192985 A1 | 7/2009 | Bolls et al. |
| 2010/0057714 A1 | 3/2010 | Miedema |
| 2011/0258032 A1 | 10/2011 | Vadlamani et al. |
| 2011/0270849 A1 | 11/2011 | Varma et al. |
| 2013/0238612 A1* | 9/2013 | Tsongas ............ G06F 17/30867 707/723 |
| 2014/0149390 A1* | 5/2014 | Chen ................. G06F 17/30867 707/722 |
| 2015/0046423 A1* | 2/2015 | Weeks ............. G06F 17/30864 707/708 |

FOREIGN PATENT DOCUMENTS

| | | |
|---|---|---|
| RU | 2419858 C2 | 5/2011 |
| WO | 14/070297 A1 | 5/2014 |

OTHER PUBLICATIONS

English translation of CN102456018 retrieved from Espacenet on Dec. 6, 2016.

English translation of CN104268142 retrieved from Espacenet on Dec. 6, 2016.

Xiao et al., Keyword Weight adjusting schema based on Domain Repository, Computer Science and Information Technology, 2010 3RD IEEE International Conference on Computer Science and Information Technology, vol. 1, Jul. 9-11, 2010.

Lin et al., Personalized Optimal Search in Local Query Expansion, Dept. of Information Management, National Yunlin University of Technology and Science, Douliou, Taiwan, 16 pages.

* cited by examiner

METHODS AND SYSTEMS FOR REFINING SEARCH RESULTS

CROSS-REFERENCE

The present application claims priority to Russian Patent Application No. 2015148502, filed Nov. 11, 2015, entitled "METHODS AND SYSTEMS FOR REFINING SEARCH RESULTS", the entirety of which is incorporated herein by reference.

FIELD

The present technology relates to search engines in general and specifically to a system and method for generating a refined search engine results page for a search query.

BACKGROUND

Various global or local communications networks (the Internet, the World Wide Web, local area networks and the like) offer a user a vast amount of information. The information includes a multitude of contextual topics, such as but not limited to, news and current affairs, maps, company information, financial information and resources, traffic information, games, and entertainment-related information. Users use a variety of client devices (desktop, laptop, notebook, smartphone, tablets, and the like) to have access to rich content (like images, audio, video, animation, and other multimedia content from such networks).

Generally speaking, a given user can access a resource on the communications network by two principle means. The given user can access a particular resource directly, either by typing an address of the resource (typically an URL or Universal Resource Locator, such as www.webpage.com) or by clicking a link in an e-mail or in another web resource. Alternatively, the given user may conduct a search using a search engine to locate a resource of interest. The latter is particularly suitable in those circumstances, where the given user knows a topic of interest, but does not know the exact address of the resource she is interested in.

There are numerous search engines available to the user. Some of them are considered to be general purpose search engines (such as Yandex™, Google™, Yahoo™, and the like). Others are considered to be vertical search engines—i.e., search engines dedicated to a particular topic of search—such as Momondo™ search engine dedicated to searching flights.

Irrespective of which search engine is used, the search engine is generally configured to receive a search query from a user, to perform a search and to return a ranked search result page (also referred to as search engine results page, or SERP) to the user. When the given user runs a web search using the search engine, he or she generally has two priorities. He or she wants the search engine to locate the most relevant results and he or she wants the results relatively quickly. To at least partially address these concerns, several attempts have been made to improve the design of the SERP in the aim of enabling the user to more easily and quickly obtain search results of interest.

U.S. Patent Application Publication No. US2009/0119278 discloses methods and systems for continual reorganization of ordered search results based on current user interaction. Responsive to each user interaction with search results to network locations returned by a search engine, a search result reorganizer predicts user interest in the search results from each dynamic user interaction. Responsive to each prediction of user interest while a user interacts with any of the search results, the search result reorganizer reorders the search results to reflect the user interest.

U.S. Patent Application Publication No. US2014/0149390 discloses a system and method for automatically providing relevant search results based on user behavior. Initial search results based on a query are displayed, enabling selection by a user of an item within the search results. Refined search results are then determined based on behavior of the user with respect to the initial search results.

U.S. Pat. No. 8,762,373 discloses a system for personalized search result ranking. The system determines a user's past search result selection activity and adjusts the ranking of current search results provided to the user based on the user's past search result selection activity.

SUMMARY

It is an object of the present technology to ameliorate at least some of the inconveniences present in the prior art.

There are provided herein methods and systems for refining search results. In a first broad aspect of the present technology, there is provided a method of generating a refined search results page (also referred to herein as a search engine results page, or SERP) for a first search query received from a user. The method is executable at a server. The method comprises receiving the first search query from an electronic device associated with the user, and, responsive to the first search query, generating a first search query result set. The first search query result set is displayed to the user on a first SERP.

The first search query result set includes a first search result and a second search result, both the first search result and the second search result including a first search result element. Based at least in part on user interaction with the first search result element on the first SERP, a first user interest parameter for the first search result element is generated. The first user interest parameter indicates user interest in the first search result element and is a weighted accumulation of user interaction with the first search result element on the first search result and the second search result.

The first user interest parameter is generated by: i) receiving an indication of a first user interaction with the first search result element on the first search result; ii) determining a first weight for the first search result element based on the first user interaction with the first search result element on the first search result; iii) receiving an indication of a second user interaction with the first search result element on the second search result; iv) determining a second weight for the first search result element based on the second user interaction with the first search result element on the second search result; and v) generating the first user interest parameter based on summing the first weight and the second weight for the first search result element.

Next, in accordance with the first broad aspect of the present technology, a second search query is generated. The second search query includes the first search query, the first search result element, and the first user interest parameter as a reformulation of the first search query indicating significance of the first search result element. Responsive to the second search query, a second search query result set is generated, and the second search query result set is displayed to the user, thereby generating the refined SERP.

In some non-limiting implementations, the first search query result set further comprises a third search result and a fourth search result, both the third search result and the fourth search result including a second search result element. The method may then further comprise the steps of, based at least in part on user interaction with the second search result element on the first SERP, generating a second user interest parameter for the second search result element. The second user interest parameter for the second search result element is generated by: receiving an indication of a third user interaction with the second search result element on the third search result; determining a third weight for the second search result element based on the third user interaction with the second search result element on the third search result; receiving an indication of a fourth user interaction with the second search result element on the fourth search result; determining a fourth weight for the second search result element based on the fourth user interaction with the second search result element on the fourth search result; and generating the second user interest parameter based on summing the third weight and the fourth weight for the second search result element. The second search result element and the second user interest parameter are then included in the second search query, thereby indicating significance of the second search result element in the reformulation of the first search query.

In some non-limiting implementations, methods provided herein further comprise the steps of refining the first user interest parameter based at least in part on user interaction with the first search result element on the refined SERP. The second search query result set on the refined SERP includes a fifth search result, the fifth search result including the first search result element. The first user interest parameter is refined by: receiving an indication of a fifth user interaction with the first search result element on the fifth search result; determining a fifth weight for the first search result element based on the fifth user interaction with the first search result element on the fifth search result; and refining the first user interest parameter based on summing the first weight, the second weight, and the fifth weight for the first search result element. A third search query is then generated, the third search query including the second search query, the first search result element, and the refined first user interest parameter, thereby reformulating the second search query to indicate significance of the first search result element. Next, responsive to the third search query, a third search query result set is generated, and the third search query result set is displayed to the user, thereby generating a second refined SERP.

In some non-limiting implementations, methods provided herein further comprise the steps of refining the second user interest parameter based at least in part on user interaction with the second search result element on the refined SERP. The second search query result set on the refined SERP may include a sixth search result, the sixth search result including the second search result element. The second user interest parameter is refined by: receiving an indication of a sixth user interaction with the second search result element on the sixth search result; determining a sixth weight for the second search result element based on the sixth user interaction with the second search result element on the sixth search result; and refining the second user interest parameter based on summing the third weight, the fourth weight, and the sixth weight for the second search result element. The second search result element and the refined second user interest parameter are then included in the third search query thereby indicating significance of the second search result element in the reformulation of the second search query.

In some non-limiting implementations, the first search result element comprises one or more of a word, a phrase, a link, and an image. Similarly, the second search result element may comprise one or more of a word, a phrase, a link, and an image.

In some non-limiting implementations, the first user interaction and the second user interaction independently comprise one or more of skipping the first search result element, fast scrolling past the first search result element, slow scrolling past the first search result element, stopping at the first search result element, highlighting the first search result element, and clicking on the first search result element.

In some non-limiting implementations, the first search result and the third search result are the same, the second search result and the fourth search result, and/or the fifth search result and the sixth search result are the same.

In some non-limiting implementations, the first user interest parameter is generated in the form of a vector $V_1(E_1, W_1)$ where $E_1$ denotes the first search result element and $W_1$ denotes the summed weight for weights $w_{1.1}, w_{1.2}, \ldots w_{1.n}$ for the first search result element, each of said weights $w_{1.1}, w_{1.2}, \ldots w_{1.n}$ being the nth weight determined for the first search result element based on the nth user interaction with the first search result element on the nth search result. Similarly, in some non-limiting implementations, the second user interest parameter is generated in the form of a vector $V_2(E_2, W_2)$, where $E_2$ denotes the second search result element and $W_2$ denotes the summed weight for weights $w_{2.1}, w_{2.2}, \ldots w_{2.n}$ for the second search result element, each of said weights $w_{2.1}, w_{2.2}, \ldots w_{2.n}$ being the nth weight determined for the second search result element based on the nth user interaction with the second search result element on the nth search result.

In accordance with a second broad aspect of the present technology, there is provided a server comprising a communication interface for communication with an electronic device associated with a user via a communication network; a memory storage; and a processor operationally connected with the communication interface and the memory storage. The processor is configured to store objects, in association with the user, on the memory storage. The processor is further configured to generate a refined SERP for a first search query received from a user, in accordance with the methods provided herein, the processor operable to execute the steps of the methods described herein.

In additional non-limiting implementations of the present technology, there is provided a server configured for generating a refined SERP for a first search query received from a user, in accordance with the methods provided herein, the server having a transient computer usable information storage medium that stores computer executable instructions, which instructions when executed are configured to render the server operable to execute the steps of the methods described herein.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device associated with the user" is any computer hardware that is capable of running software appropriate to the relevant task at hand. Thus, some (non-limiting) examples of electronic devices associated with users include personal computers (desktops, laptops, netbooks, etc.), smartphones, and tablets, as well as network equipment such as routers, switches, and gateways. It should be noted that a device acting as an electronic device associated with the user in the present context is not precluded from acting as a server to other user-associated electronic devices. The use of the expression "an electronic device associated with the user" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations, etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the expression "component" is meant to include software (appropriate to a particular hardware context) that is both necessary and sufficient to achieve the specific function(s) being referenced.

In the context of the present specification, the expression "search query" is intended to include any type of request including one or more search terms that can be submitted to a search engine (or multiple search engines) for identifying search results, and/or component(s) thereof, based on the search term(s) contained in the query. The search results or components thereof that are identified by the queries in the data structure are representations of results produced in response to the queries. For example, the search results can be web results, instant answers, images, etc.

In the context of the present specification, the expression "search result" is intended to include a component on a search results page (i.e., SERP) that is displayed in response to a search query. By way of example only, a component can be, for instance, a web result, an instant answer, a related search result, an advertisement, an image, a tab item, a link, or the like. In one embodiment, for example, a search result can be a web result, an instant answer, a related search result, an advertisement, a tab item, an image, a link, or the like.

Additionally or alternatively, a search result can be a set of components displayed as a group adjacent to one another on a search results page. For example, a search result can be a group of images that are positioned adjacent to one another such that the group appears as one search result. The terms "search result" and "search result item" are used interchangeably herein.

The expression "search result" is intended to include both general and vertical search results. A "general search result" is generated by searching a general domain. A "vertical search result" is generated by searching a vertical domain.

In the context of the present specification, the expression "general domain" is intended to include general content, for example, indexed internet content or web content. For example, a general domain search is not confined to search a specific category of results but is able to provide all results that best match the query. Such a general (category-independent) search by a search engine may return search results that include non-category specific digital content as well as category specific digital content, such as images, videos, news, shopping, blogs, books, places, discussions, recipes, patents, stocks, timelines, etc., and other digital content that is closely related and directed toward a certain type of digital content. As an example, a general domain search may be a world-wide web (WWW) search. A search performed in a general domain generates a "general search result" or "general search result item." Such general search results are also referred to herein as "web results" and "web search results". Typically, a web result includes a website link and a snippet that summarizes content of the website. A user may select a website link of a web result to navigate to the webpage related to the user search query.

In the context of the present specification, the expression "vertical domain" is intended to include an information domain containing specialized content, such as content of a single type (e.g., media type, genre of content, topicality, etc.). A vertical domain thus includes a specific subset of a larger set of data, for example, a specific subset of web data. For example, a vertical domain may include specific information such as news, images, videos, local businesses, items for sale, weather forecasts, etc. A search performed in a vertical domain generates a "vertical search result" or a "vertical search result item."

In the context of the present specification, the expression "search query result set" is intended to include a set of more than one search result obtained in response to a search query. General (e.g., Web) search results and/or vertical search results are often integrated together within the search query result set on a search results page. For example, vertical search results may be integrated into general (e.g., Web) search results within a search query result set displayed on a search results page, or vice-versa, i.e., general search results may be integrated into vertical search results within a search query result set displayed on a search results page. Thus, in some embodiments, general search results and vertical search results may be aggregated and ranked relative to each other. In alternative embodiments, a search query result set may include only general search results or only vertical search results, e.g., search results from a particular vertical domain of interest.

In some implementations, general search results are first ranked based on a general domain-ranking parameter, before being aggregated with vertical search results and displayed on a SERP. In the context of the present specification, the expression "general domain-ranking parameter" is intended to include a ranking tool that is used to rank general search results items. Many such ranking tools are known and it should be understood that any such tools may be used in methods and systems provided herein. In one implementation, a general domain-ranking parameter is based on or includes at least one user-specific general ranking attribute. As used herein, the expression "user-specific general ranking attribute" is intended to include any feature or combination of features of the user's search history pertaining to general search results, such as, for example, click-through rates in query logs, navigation history, search history, and the like, that can be analyzed to determine where general search result items, or components thereof, should be placed within a general search results page in accordance with the user's needs or preferences.

Similarly, in some implementations, vertical search results are first ranked based on a vertical domain-ranking parameter, before being aggregated with general search results and displayed on a SERP. In the context of the present specification, the expression "vertical domain-ranking parameter" is intended to include a ranking tool that is used to rank vertical search results items. Many such ranking tools are known and it should be understood that any such tools may be used in methods and systems provided herein. In one implementation, a vertical domain-ranking parameter is based on or includes at least one user-specific vertical ranking attribute. As used herein, the expression "user-specific vertical ranking attribute" is intended to include any feature or combination of features of the user's search history pertaining to vertical search results, such as, for example, click-through rates in query logs, navigation history, search history, and the like, that can be analyzed to determine where vertical search result items, or components thereof, should be placed within a vertical search results page in accordance with the user's needs or preferences.

In the context of the present specification, the expression "search result element" is intended to include a portion of a search result indicating a particular content, having a particular meaning, or linking to a particular item of information. A search result can generally be considered to be made up of a number of search result elements. A search result element is not meant to be particularly limited and can be text-based, image-based, audio-based, etc. In some embodiments, a search result element comprises one or more word, phrase, text string, link to a website (e.g., a web address), image, audio recording, or combination thereof.

In the context of the present specification, the expression "user interaction" is intended to refer to the user's behavior with respect to search results, particularly search result elements. User interaction generally refers to a user engaging or interacting (e.g., selecting, highlighting, clicking, etc.) with a search result element. For example, a user may take certain actions while inspecting search results, such as selecting or highlighting a search result element, skipping over a search result element, fast scrolling past a search result element, slow scrolling past a search result element, stopping at a search result element, clicking on a search result element, etc. Such user interactions provide information that can help determine the search result elements of greatest interest or relevance to the user. It should be expressly understood that the particular user behavior or action is not meant to be particularly limited.

In the context of the present specification, the expression "user interest parameter" is intended to include a parameter that indicates user interest in a particular search result element on a SERP, based at least in part on user interaction(s) with the search result element on the SERP. The user interest parameter is generated by summing the weighted user interactions with the search result element at each occurrence of the search result element on the SERP. For example, if the search result element occurs in three separate places on the SERP, then the user interest parameter is the weighted sum of user interactions with the search result element at each of the three places on the SERP where it occurs. The user interest parameter is thus a weighted accumulation of user interactions with the search result element at each occurrence on the SERP. Search result elements with which the user interacts the most strongly (e.g., highlights, selects, stops at, clicks on) are generally considered to be of greater interest to the user and will have a higher user interest parameter. Search result elements with which the user interacts less or not at all (e.g., skips over, scrolls quickly by) are generally considered to be of less interest to the user and will have a lower user interest parameter.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
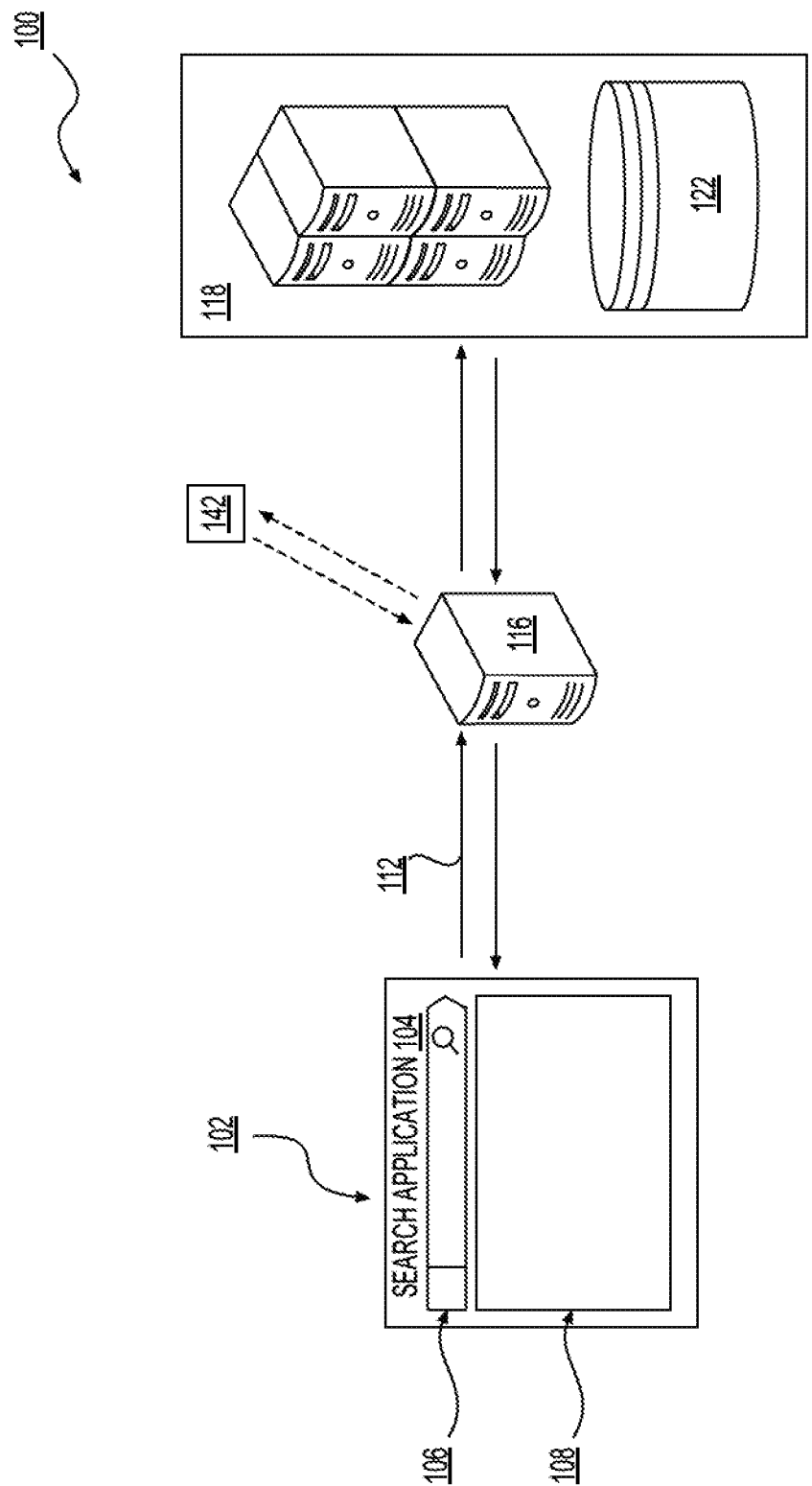
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to receive search queries and to conduct web searches (e.g., general searches, vertical searches) in response thereto, as well as to generate and display search results pages in accordance with non-limiting embodiments of the present technology. As such, any system variation configured to generate search results pages can be adapted to execute embodiments of the present technology, once teachings presented herein are appreciated.

The system 100 comprises an electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered, or the like.

The implementation of the electronic device 102 is not particularly limited, but as an example, the electronic device 102 may be implemented as a personal computer (desktops, laptops, netbooks, etc.), a wireless communication device (such as a smartphone, a cell phone, a tablet and the like), as well as network equipment (such as routers, switches, and gateways). The electronic device 102 comprises hardware and/or software and/or firmware (or a combination thereof), as is known in the art, to execute a search application 104.

Generally speaking, the purpose of the search application 104 is to enable the user (not depicted) to execute a search, such as the above mentioned web search using the above-mentioned search engine.

How the search application 104 is implemented is not particularly limited. One example of the search application 104 may include a user accessing a web site associated with a search engine to access the search application 104. For example, the search application can be accessed by typing in an URL associated with Yandex™ search engine at www.yandex.ru. It should be expressly understood that the search application 104 can be accessed using any other commercially available or proprietary search engine.

In alternative non-limiting embodiments of the present technology, the search application 104 may be implemented as a browser application on a portable device (such as a wireless communication device). For example (but not limited to) those implementations, where the electronic device 102 is implemented as a portable device, such as for example, Samsung™ Galaxy™ SIII, the electronic device may be executing a Yandex browser application. It should be expressly understood that any other commercially available or proprietary browser application can be used for implementing non-limiting embodiments of the present technology.

Generally speaking, the search application 104 comprises a search query interface 106 and a search result interface for displaying the search results page (or SERP) 108. The general purpose of the search query interface 106 is to enable the user (not depicted) to enter his or her search query or a portion thereof, e.g., a "search string". The general purpose of the SERP 108 is to provide search results that are responsive to the user search query entered into the search query interface 106. How the user search query is processed and how the search results are presented will be described in detail herein below.

Also coupled to a communication network (not depicted) is a server 116. The server 116 can be implemented as a conventional computer server. In an example of an embodiment of the present technology, the server 116 can be implemented as a Dell™ PowerEdge™ Server running the Microsoft™ Windows Server™ operating system. The server 116 can be implemented in any other suitable hardware, software, and/or firmware, or a combination thereof. In the depicted non-limiting embodiments of the present technology, the server 116 is a single server. In alternative non-limiting embodiments of the present technology, the functionality of the server 116 may be distributed and may be implemented via multiple servers. Implementation of the server 116 is not particularly limited. The server 116 is capable of receiving requests (e.g., from an electronic device 102 associated with a user (not depicted)) over a communication link 112, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

The electronic device 102 is configured to communicate with the server 116 over a communication link 112. Generally speaking, the communication link 112 enables the electronic device 102 to access the server 116 via the communication network (not depicted). In some non-limiting embodiments of the present technology, the communication network (not depicted) can be implemented as the Internet. In other embodiments of the present technology, the communication network (not depicted) can be implemented differently, such as any wide-area communication network, local-area communication network, a private communication network and the like.

How the communication link 112 is implemented is not particularly limited and will depend on how the electronic device 102 is implemented. Merely as an example and not as a limitation, in those embodiments of the present technology where the electronic device 102 is implemented as a wireless communication device (such as a smartphone), the communication link 112 can be implemented as a wireless communication link (such as but not limited to, a 3G communication network link, a 4G communication network link, Wireless Fidelity, or WiFi® for short, Bluetooth® and the like). In those examples where the electronic device 102 is implemented as a notebook computer, the communication link 112 can be either wireless (such as Wireless Fidelity, or WiFi® for short, Bluetooth® or the like) or wired (such as an Ethernet based connection).

The server 116 is communicatively coupled (or otherwise has access) to a search cluster 118. According to some embodiments of the present technology, the search cluster 118 performs web searches (e.g., general and/or vertical searches) in response to the user search queries inputted via the search query interface 106 and outputs search results to be presented to the user using the SERP 108. Within these non-limiting embodiments of the present technology, the search cluster 118 comprises or otherwise has access to a database 122. As is known to those of skill in the art, the database 122 stores information associated with a plurality of resources potentially accessible via the communication network (for example, those resources available on the Internet). The process of populating and maintaining the database 122 is generally known as "crawling". It should be expressly understood that in order to simplify the description presented herein below, the configuration of the search cluster 118 has been greatly simplified. It is believed that those skilled in the art will be able to appreciate implementational details for the search cluster 118 and for components thereof.

Additionally or optionally and, as known to those skilled in the art, the database 122 may comprise one or more database, which one or more database may be segregated into one or more separate databases (not depicted). These segregated databases may be portions of the same physical database or may be implemented as separate physical entities. In some non-limiting embodiments of the present technology, the database 122 may comprise a database hosting data associated with a particular service implemented by a vertical search module, e.g., pictures, photos, videos, images, etc. associated with the respective vertical search module. As one example, one database within, let's say, the database 122 could host the most popular/most frequently requested pictures for a given subject, while another database within the database 122 could host all the pictures available. The above has been provided as an illustration only and several additional possibilities exist for implementing embodiments of the present technology.

Within these embodiments of the present technology, the server 116 is configured to access the search cluster 118 to perform general web and/or vertical searches. In some embodiments, the search cluster 118 can be responsible for coordinating and executing both general web searches and vertical searches. In some embodiments of the present technology, the search cluster 118 can execute a multi layer meta search by executing both general web and vertical searches. It should be expressly understood that implementation of the search cluster 118 is not particularly limited. In some embodiments, the search cluster 118 may, for example, include a plurality of search modules, some dedicated to general web searching and others for searching a particular vertical domain.

Within the embodiment depicted in FIG. 1, the server 116 is generally configured to (i) conduct searches (by accessing the search cluster 118); (ii) execute analysis of search results and perform ranking of search results; (iii) group search results and compile the search result page (SERP) to be outputted to the electronic device 102.

According to non-limiting embodiments of the present technology, the server 116 further comprises or has access to a SERP refinement module 142. The operation of the SERP refinement module 142 within the context of refining a SERP for a search query received from a user according to non-limiting embodiments of the present technology will now be described.

In the non-limiting embodiment of the present technology depicted in FIG. 1, the SERP refinement module 142 is a single SERP refinement module. In alternative non-limiting embodiments of the present technology, the server 116 can be communicatively coupled (or otherwise has access) to a plurality of SERP refinement modules (not depicted). The SERP refinement module 142 can be configured to generate a user interest parameter for a search result element on a SERP, refine a user interest parameter, reformulate a search query, and generally perform other actions required to generate a refined SERP, in accordance with the methods described herein. It should be expressly understood that a number of additional or different services can be implemented as part of the plurality of SERP refinement modules (not depicted), and that the number of modules within the plurality of SERP refinement modules is not meant to be limited.

Figure 2:
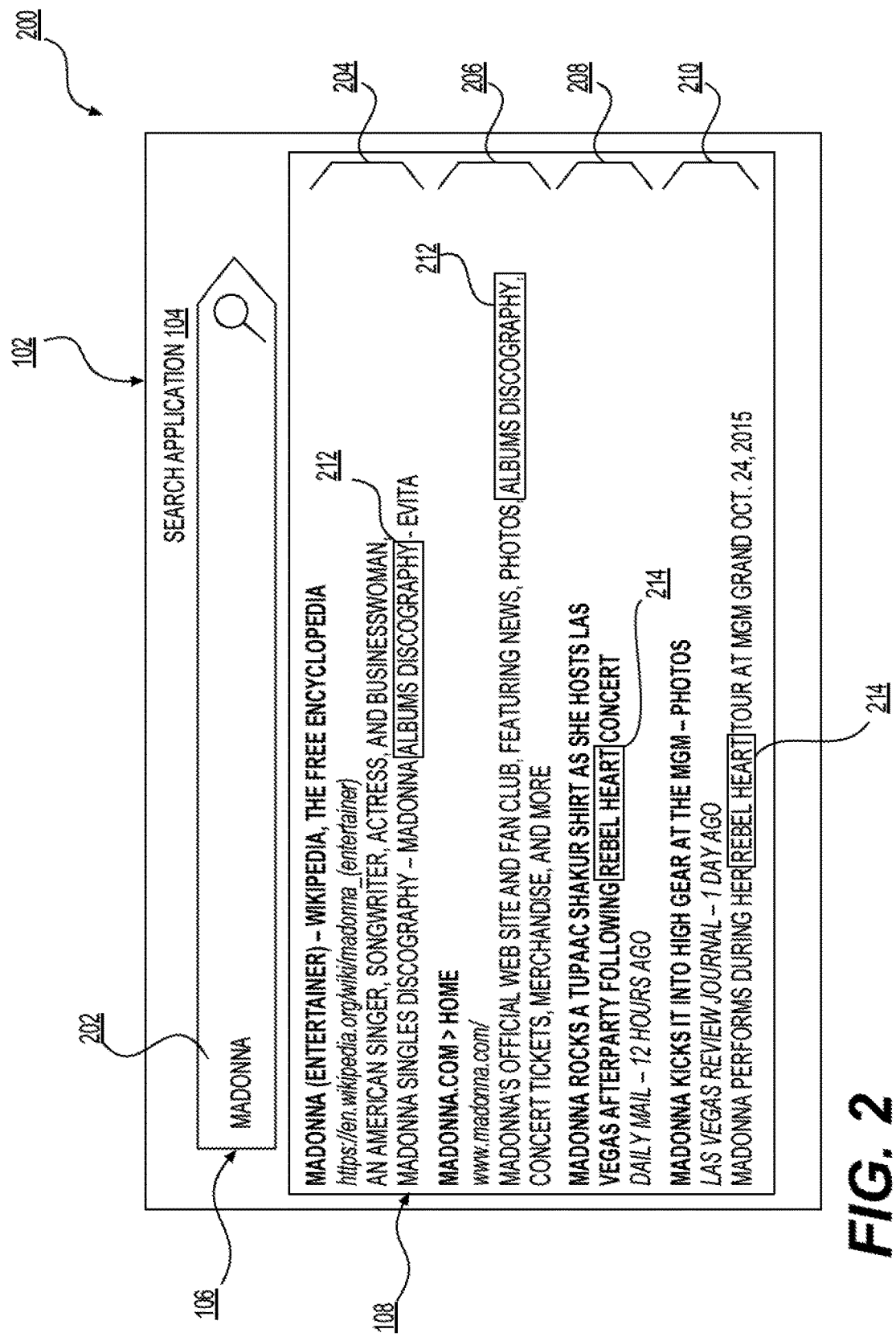
FIG. 2 is a schematic representation of a screen shot of the electronic device of the system of FIG. 1, the electronic device being implemented in accordance with non-limiting embodiments of the present technology.

In order to fully appreciate implementations of the present technology, an example of the SERP 108 will now be described in greater detail. With reference to FIG. 2, there is depicted a schematic representation of a screen shot 200 of information displayed on the electronic device 102 of FIG. 1. The search application 104 includes the search query interface 106 and the SERP 108, the first search query 202 ("Madonna") having been entered into the search query interface 106 by the user (not depicted). According to non-limiting embodiments of the present technology, there are shown four search results responsive to the first search query 202: the first search result 204, the second search result 206, the third search result 208, and the fourth search result 210. The first search result 204 and the second search result 206 both include the first search result element 212 ("albums discography"). The third search result 208 and the fourth search result 210 both include the second search result element 214 ("Rebel Heart").

It should be expressly understood that the screen shot 200 shown in FIG. 2 is provided for illustrative purposes only and is not meant to be limiting. For example, the number and type of search results, the number and type of search result elements, the size of the SERP, etc., are not particularly limited. Although the embodiment shown in FIG. 2 shows general search results, it should be expressly understood that the SERP may include vertical search results such as images in place of, or in combination with, general search results.

Figure 3:
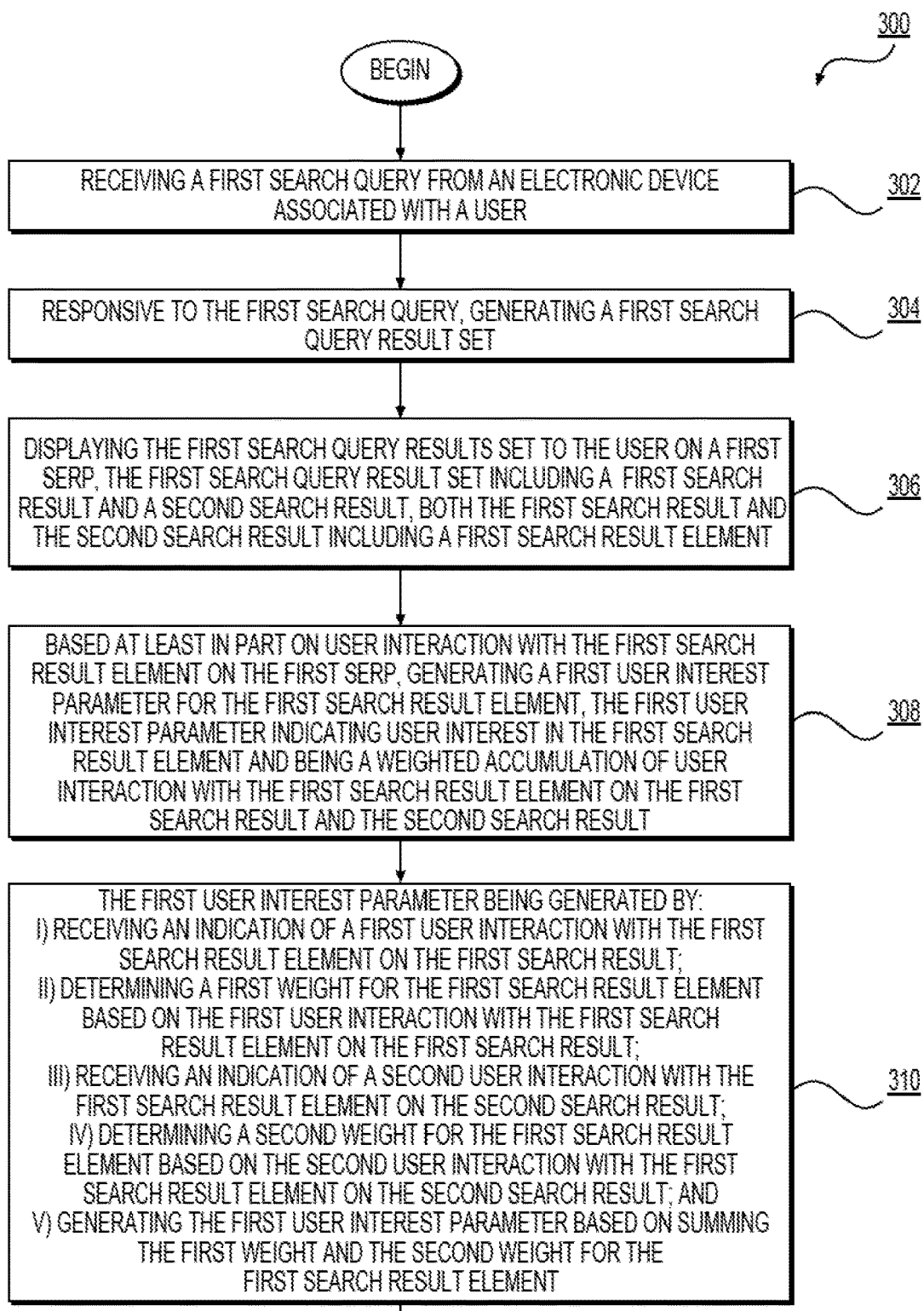
FIG. 3 depicts a block diagram of a method, the method being executable within the system of FIG. 1 and being implemented in accordance with non-limiting embodiments of the present technology.
Figure 3:
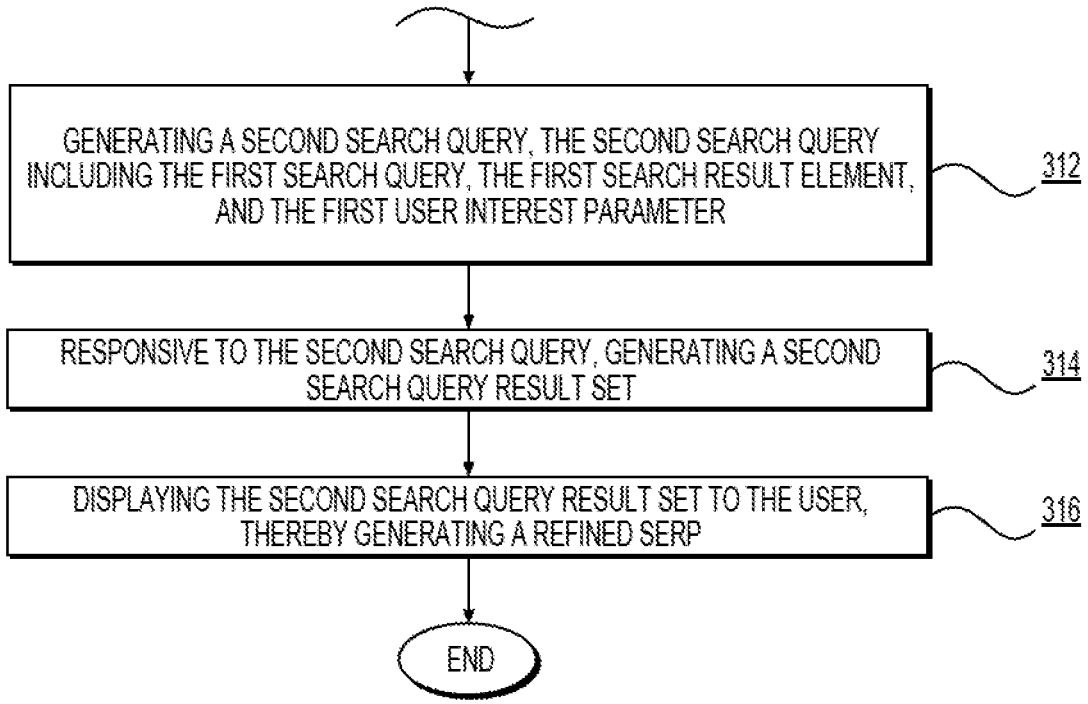

Reference will now be made to FIG. 3, which depicts a block diagram of a method 300, the method 300 being implemented in accordance with non-limiting embodiments of the present technology. The method 300 can be conveniently executed at server 116.

Step 302—Receiving a First Search Query From an Electronic Device Associated With the User The method 300 begins at step 302, where the first search query 202 is received from the electronic device 102 associated with the user (not depicted). Generally, the first search query 202 includes one or more search terms that can be submitted to a search engine (or multiple search engines) for identifying search results, and/or component(s) thereof, based on the search term(s) contained in the query. In the non-limiting example shown in FIG. 2, which is provided for illustrative purposes only, the first search query 202 is "Madonna".

The method 300 now continues with step 304.

Step 304—Responsive to the First Search Query, Generating a First Search Query Result Set At step 304, the server 116 generates a first search query result set (including the first search result 204, the second search result 206, the third search result 208, and the fourth search result 210) in response to the first search query 202. As discussed above, the server 116 generally conducts searches by accessing the search cluster 118. The first search query result set may include general search results, vertical search results, and combinations thereof.

The method 300 then continues with step 306.

Step 306—Displaying the First Search Query Result Set to the User on a First SERP, the First Search Query Result Set Including a First Search Result and a Second Search Result, Both the First Search Result and the Second Search Result Including a First Search Result Element Continuing now with step 306, electronic device 102 associated with the user (not depicted) is caused to display the first search query result set within the first SERP 108. Electronic device 102 associated with the user is coupled communicatively with the server 116 such that SERP 108 is displayed on the electronic device 102 in response to the first search query 202 having been received in step 302 and the first search query result set having been generated in step 304.

As mentioned above, the first search query result set includes the first search result 204, the second search result 206, the third search result 208, and the fourth search result 210. The search query results 204, 206, 208, 210 in the first search query result set have been ranked and are displayed accordingly in ranked order. For example, in the non-limiting embodiment shown in FIG. 2, the first search result 204 is ranked higher than the second search result 206, and displayed accordingly above the second search result 206; the second search result 206 is ranked higher and displayed accordingly above the third search result 208; and so on.

Ranking refers generally to identifying an order, position, or placements for search results and/or components thereof, relative to each other. Search results most relevant to a particular search query are generally provided with a higher ranking. A higher rank is used to refer to a rank that is stronger or otherwise indicates a higher priority or preference. Rankings can generally be based on any data such as, for example, click-through rates in query logs, history of user(s), query intent, results attributes (e.g., type or category of search result), and a combination thereof. Rankings are used to determine where search results, or components thereof, should be placed within a search results page. It will be understood by those skilled in the art that rankings may or may not be personalized or user-specific, i.e., they may or may not be based on the user's personal information, such as features of the user's search history.

Those skilled in the art will appreciate that there are various techniques available for ranking and/or personalizing search results. Just as an example and not as a limitation, some of the known techniques for ranking search results by relevancy are based on some or all of: (i) popularity of a given search query or a response thereto; (ii) number of results returned for a search query; (iii) whether the search query contains any determinative terms (such as "images", "movies", "weather" and the like); (iv) how often a particular search query is typically used with determinative terms by other users; and (v) how often other users performing a similar search have selected a particular resource or a particular vertical search results item when results were presented using a standard SERP. It should be understood that any such ranking and/or personalization techniques may be used in addition to, or in combination with, methods and systems provided herein.

Those skilled in the art will appreciate that general search results obtained from a search engine are typically ranked using known ranking techniques, e.g., one or more general ranking algorithm, many of which are known in the art, before search results are retrieved or displayed. Similarly, vertical search results obtained from a search engine are typically ranked using known ranking techniques, e.g., one or more vertical ranking algorithm, many of which are known in the art, before search results are retrieved or displayed. Thus, it should be understood that in some embodiments of the technology, a first general search result item and a second general search result item have been ranked relative to each other using known ranking techniques, and a first vertical search result item and a second vertical search result item have been ranked relative to each other using known ranking techniques, prior to display on the SERP 108. For example, in FIG. 2, the first search result 204 is ranked higher than the second search result 206, which is ranked higher than the third search result 208, which is ranked higher than the fourth search result 210; in the non-limiting embodiment shown in FIG. 2, these rankings are the result of ranking general search results using a general ranking algorithm.

Such prior rankings may or may not be personalized, i.e., they may or may not be based on a user-specific ranking attribute. In some implementations, such prior rankings of general search results and/or vertical search results are based on known, general ranking techniques, and are not user-specific. In other implementations, such prior rankings of general search results and/or vertical search results are user-specific, i.e., are based on user-specific general or vertical ranking attributes. User-specific ranking attributes are based on the user's personal information, such as features of the user's search history, as described herein, and provide personalized rankings. In this way multiple levels of personalized ranking may be incorporated in methods and systems of the present technology, as general search results and/or vertical search results may first be ranked according to user-specific ranking attributes.

In some non-limiting implementations, the method 300 further comprises a step of determining that the first search result 204, the second search result 206, the third search result 208, and the fourth search result 210 are relevant to the user's search query, prior to ranking them relative to each other.

The number and type of search results 204, 206, 208, 210 included in the first search query result set and/or displayed on the first SERP 108 is not particularly limited. In the non-limiting embodiment shown in FIG. 2, four general search results 204, 206, 208, 210 are displayed on the first SERP 108. However, a smaller or greater number of search results may be displayed. The number of search results displayed will depend on a number of factors, such as the size and display parameters of the electronic device 102, the number of search results obtained, and the like. Further, vertical search results (such as images, audio files, etc.) may be displayed, in place of or in addition to the general search results 204, 206, 208, 210. It should be expressly understood that the search query result set is not particularly limited.

Further, the first SERP 108 depicted in FIG. 2 shows the four general search results 204, 206, 208, 210 displayed in a column, one below the other. It should be understood however that the display is not particularly limited. For example, search results may be arranged vertically, horizontally, in a grid pattern, or in some combination thereof. Presentation of the search results within the SERP 108 may vary depending on the type of electronic device 102 associated with the user. For example, a display for a desktop computer may be larger than a display for a notebook, netbook, or tablet, which may themselves be larger than a display for smaller electronic devices, such as mobile phones. The size of the display may affect the number of search results displayed within a SERP 108, as well as the number of sublinks, snippets, the amount of summary information, etc., that is displayed. In some embodiments, the position of the search results 204, 206, 208, 210 within the SERP 108 may be referred to as the rank of the search results 204, 206, 208, 210 on the SERP 108. However, in some embodiments, rank may be reflected in display attributes other than, or in addition to, position, such as prominence, size, color, etc., within the SERP 108.

The first search result 204 and the second search result 206 both include a first search result element 212. In the non-limiting embodiment shown in FIG. 2, the first search result element 212 is "albums discography". In general, a search result element is a particular item of information in a search result such as one or more word, phrase, link, or image. Although the non-limiting embodiment shown in FIG. 2 depicts the first search result element 212 which is a phrase, it should be expressly understood that the number and type of search result elements within a particular search result and on a particular SERP are not particularly limited.

Selection of search result elements is not particularly limited. In some non-limiting implementations, search result elements are selected based at least in part on analysis of search result components. For example, textual or semantic analysis of the search results may identify certain phrases, names, or strings as search result elements. Similarly, discrete components of search results, such as a link to a web page (e.g., a web address) or an image, may be identified as search result elements. In alternative non-limiting implementations, search result elements are selected based at least in part on user interaction with the search results 204, 206, 208, 210 displayed on the first SERP 108. For example, the phrase "albums discography" may be identified as first search result element 212 based at least in part on the user having highlighted the phrase in the first search result 204. In further non-limiting implementations, search result elements are selected in accordance with predetermined criteria. Other implementations are possible and may be used in the methods described herein.

The method 300 now continues with step 308.

Step 308—Based at Least in Part on User Interaction With the First Search Result Element on the First SERP, Generating a First User Interest Parameter for the First Search Result Element, the First User Interest Parameter Indicating User Interest in the First Search Result Element and Being a Weighted Accumulation of User Interaction With the First Search Result Element on the First Search Result and the Second Search Result Continuing now with step 308, a first user interest parameter (not depicted) for the first search result element 212 is generated, based at least in part on user interaction with the first search result element 212 on the first SERP 108. The first user interest parameter indicates user interest in the first search result element 212 and is a weighted accumulation of user interaction with the first search result element 212 on the first SERP 108, i.e., on the first search result 204 and the second search result 206.

In some non-limiting implementations, the first user interest parameter is generated by the SERP refinement module 142. How the SERP refinement module 142 generates the first user interest parameter is now described in more detail with reference to step 310 of the method 300.

Step 310—the First User Interest Parameter Being Generated by: i) Receiving an Indication of a First User Interaction With the First Search Result Element on the First Search Result; ii) Determining a First Weight for the First Search Result Element Based on the First User Interaction With the First Search Result Element on the First Search Result; iii) Receiving an Indication of a Second User Interaction With the First Search Result Element on the Second Search Result; iv) Determining a Second Weight for the First Search Result Element Based on the Second User Interaction With the First Search Result Element on the Second Search Result; and v) Generating the First User Interest Parameter Based on Summing the First Weight and the Second Weight for the First Search Result Element Continuing now with step 310, the first user interest parameter (not depicted) is generated as follows: first, indication of a first user interaction with the first search result element 212 on the first search result 204 is received. For example, the user (not depicted) may interact with the first search result 204, while directly or indirectly interacting with the first search result element 212. As an example, the user (not depicted) may highlight, select, or place the cursor over the phrase "albums discography" (the first search result element 212) where it occurs in the first search result 204. Alternatively, the user may skip over the occurrence of this phrase in the first search result 204 altogether.

The nature of the first user interactions is not particularly limited. The user may engage strongly, weakly, or not at all with the first search result element 212 on the SERP 108. In some non-limiting implementations, the first user interaction comprises one or more of skipping the first search result element 212, fast scrolling past the first search result element 212, slow scrolling past the first search result element 212, stopping at the first search result element 212, highlighting the first search result element 212, and clicking on the first search result element 212.

Next, a first weight for the first search result element 212 based on the first user interaction with the first search result element 212 on the first search result 204 is determined. For example, suppose the user highlights the phrase "albums discography" (the first search result element 212) in the first search result 204, where it occurs on the fourth line of the first search result 204, before the phrase "Evita". In this case, the first weight is determined to be "+1", highlighting being a sign of user interest, a weight of "+1" indicating the level of user interest. In contrast, suppose the user skips over the phrase "albums discography" (the first search result element 212) in the first search result 204. In that case, the first weight is determined to be "−1", skipping over being an indicator of user disinterest, a weight of "−1" indicating that level of user disinterest.

Next, an indication of a second user interaction with the first search result element 212 on the second search result 206 is received. For example, the user (not depicted) may highlight, select, or place the cursor over the phrase "albums discography" (the first search result element 212) where it occurs in the second search result 206. Alternatively, the user may skip over the occurrence of this phrase in the second search result 206 altogether.

In some non-limiting implementations, the second user interaction comprises one or more of skipping the first search result element 212, fast scrolling past the first search result element 212, slow scrolling past the first search result element 212, stopping at the first search result element 212, highlighting the first search result element 212, and clicking on the first search result element 212.

Next, a second weight for the first search result element 212 based on the second user interaction with the first search result element 212 on the second search result 206 is determined. For example, suppose the user highlights the phrase "albums discography" (the first search result element 212) in the second search result 206, where it occurs at the end of the third line of the second search result 206, after the phrase "photos". In this case, the second weight may be determined to be "+1", highlighting being a sign of user interest. In some non-limiting embodiments, the second weight in this case may be determined to be higher than "+1", e.g., "+2", to reflect the fact that the first search result element 212 is located at the end of the third line in the second search result 206, the end of the third line being a remote location and selection thereby indicating a higher level of user interest. It should be understood that the implementation for assessing and assigning weights to a search result element is not meant to be particularly limited and will vary depending on numerous factors, including predetermined criteria such as the algorithm used to determine the user interest parameter. The numerical values assigned to weights herein are provided for illustrative purposes only and many other implementations are possible.

Finally, the first user interest parameter is generated based on summing the first weight and the second weight for the first search result element 212. For example, suppose the first weight is determined to be "+1" based on the first user interaction with the first search result element 212 on the first search result 204, and the second weight is determined to be "+2" based on the second user interaction with the first search result element 212 on the second search result 206. The first user interest parameter would then be +3 (the sum of +1 and +2), the first user interest parameter being a weighted accumulation of user interaction with the first search result element 212 on the first search result 204 and user interaction with the first search result element 212 on the second search result 206.

To give another example, suppose the first weight is determined to be "+1" based on the first user interaction with the first search result element 212 on the first search result 204, and the second weight is determined to be "−1" based on the second user interaction with the first search result element 212 on the second search result 206. The first user interest parameter would then be 0 (the sum of +1 and −1), the first user interest parameter being a weighted accumulation of user interaction with the first search result element 212 on the first search result 204 and user interaction with the first search result element 212 on the second search result 206.

In some non-limiting implementations, the first user interest parameter is generated using a machine learning algorithm, such as a decision tree-based algorithm, an association rule-learning based algorithm, a neural network-based algorithm, a regression-based algorithm, etc. Other implementations are possible and methods for generating user interest parameters are not meant to be particularly limited.

In some non-limiting implementations, the first user interest parameter is generated in the form of a vector, $V_1(E_1, W_1)$, where $E_1$ denotes the first search result element 212 and $W_1$ denotes the sum of the first weight and the second weight, i.e., the summed weight for weights $w_{1.1}, w_{1.2}, \ldots w_{1.n}$ for the first search result element, each of said weights $w_{1.1}, w_{1.2}, \ldots w_{1.n}$ being the nth weight determined for the first search result element 212 based on the nth user interaction with the first search result element 212 on the nth search result. Continuing with the examples described above, the first user interest parameter $V_1$ would be generated in the form of a vector $V_1$(albums discography, +3) for the first example, and $V_1$(albums discography, 0) for the second example. Other implementations are possible and implementation of the user interest parameter is not meant to be particularly limited.

The method 300 now continues with step 312.

Step 312—Generating a Second Search Query, the Second Search Query Including the First Search Query, the First Search Result Element, and the First User Interest Parameter as a Reformulation of the First Search Query Indicating Significance of the First Search Result Element At step 312, a second search query (not depicted) is generated. In accordance with non-limiting embodiments of the present technology, the second search query is a reformulation of the first search query 202 received in step 302. The reformulation is based, at least on part, on the first search result element 212 and its associated first user interest parameter. More specifically, the second search query includes the first search query 202 ("Madonna"), the first search result element 212 ("albums discography"), and the first user interest parameter (e.g., $V_1$(albums discography, +3)). In this way the first search query 202 is reformulated based at least in part on the significance of the first search result element 212, the significance of the first search result element 212 being determined by user interest therein as indicated by the first user interest parameter (e.g., $V_1$). The second search query is generated by reformulating the first search query 202 accordingly.

The method 300 now continues with step 314.

Step 314—Responsive to the Second Search Query, Generating a Second Search Query Result Set At step 314, a second search query result set (not depicted) is generated in response to the second search query (not depicted). The server 116 generates a second search query result set in response to the second search query by accessing the search cluster 118.

The second search query result set is not particularly limited. Like the first search query result set, the second search query result set may include any number or type of search results. The second search query result set may include general search results, vertical search results, and combinations thereof. The search results in the second search query result set are generally ranked according to general ranking procedures, as discussed above.

The second search query result set may or may not include one or more of the first search result 204, the second search result 206, the third search result 208, and the fourth search result 210. As will be understood by those skilled in the art, depending on numerous factors (such as the first user interest parameter, the similarity between the second search query and the first search query 202, the search parameters, etc.), the second search query result set may or may not overlap with the first search query result set. The degree of overlap will also vary considerably. In the first example above where the first user interest parameter is +3, the second search query result set may differ substantially from the first search query result set, due to the relatively strong user interest in the first search result element 212 indicated by the first user interest parameter. In contrast, in the second example above where the first user interest parameter is 0, the second search query result set may not differ substantially from the first search query result set, due to the neutral user interest in the first search result element 212 indicated by the first user interest parameter. Other implementations are possible.

In some embodiments of the present technology, the second search query result set can be amended to remove search results that have already been displayed as part of the first search query result set (i.e., the first search result 204, the second search result 206, the third search result 208, and the fourth search result 210).

The method 300 now continues with step 316.

Step 316—Displaying the Second Search Query Result Set to the User, Thereby Generating a Refined SERP At step 316, the electronic device 102 associated with the user is caused to display the second search query result set (not depicted). Electronic device 102 associated with the user (not depicted) is coupled communicatively with the server 116 such that a new, refined SERP (not depicted) including the second search query result set (not depicted) is displayed on the electronic device 102 in response to the second search query having been generated in step 312 and the second search query result set having been generated in step 314.

The refined SERP is a refined version of the first SERP 108, the first SERP 108 having been refined based at least in part on the significance of the first search result element 212 on the first SERP 108, the significance of the first search result element 212 on the first SERP 108 being determined by user interest therein as indicated by the first user interest parameter.

It should be understood that the refined SERP is not particularly limited. In particular, the number and type of search results and the arrangement of the search results on the refined SERP will vary depending on numerous factors, such as the type of electronic device 102 associated with the user, the nature of the first search query 202 and the second search query, user preferences, and the like. Search results displayed on the refined SERP are generally ranked in accordance with standard ranking procedures, as described above. In some non-limiting implementations, the method 300 further comprises a step of determining that the search results in the second search query result set are relevant to the second search query, prior to ranking them relative to each other.

Figure 4:
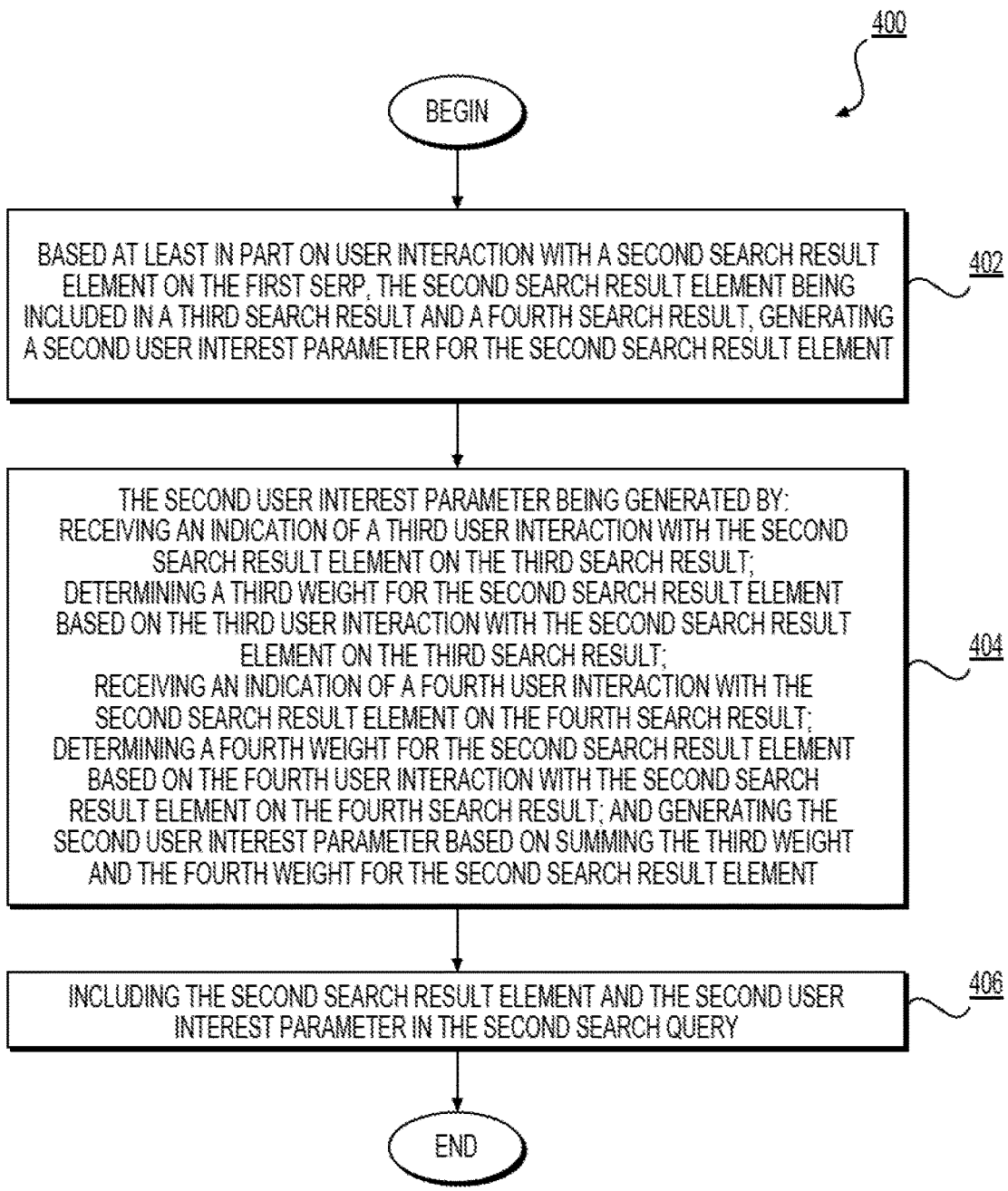
FIG. 4 depicts a block diagram of a method, the method being executable within the system of FIG. 1 and being implemented in accordance with non-limiting embodiments of the present technology.

Reference will now be made to FIG. 4, which depicts a block diagram of a method 400, the method 400 being implemented in accordance with other non-limiting embodiments of the present technology. The method 400 can be conveniently executed at server 116.

Like the method 300, the method 400 includes steps 302-316, as described above. For ease of understanding, steps 302-316 are not repeated here. The method 400 further comprises steps 402-406, which we will now describe.

Step 402—Based at Least in Part on User Interaction With a Second Search Result Element on the First SERP, the Second Search Result Element Being Included in a Third Search Result and a Fourth Search Result, Generating a Second User Interest Parameter for the Second Search Result Element At step 402, a second user interest parameter is generated. The second user interest parameter indicates user interest in the second search result element 214 (the phrase "Rebel Heart" in the example shown in FIG. 2). The second search result element 214 is included in third search result 208 and fourth search result 210 on the first SERP 108. The second user interest parameter is a weighted accumulation of user interaction with the second search result element 214 on the third search result 208 and the fourth search result 210.

Like the first search result element 212, the second search result element 214 is not particularly limited. In some non-limiting implementations, the second search result element 214 is one or more of a word, a phrase, a link, and an image.

In some non-limiting implementations, the second user interest parameter is generated by the SERP refinement module 142. How the SERP refinement module 142 generates the second user interest parameter is now described in more detail with reference to step 404 of the method 400.

Step 404—the Second User Interest Parameter Being Generated by: Receiving an Indication of a Third User Interaction With the Second Search Result Element on the Third Search Result; Determining a Third Weight for the Second Search Result Element Based on the Third User Interaction With the Second Search Result Element on the Third Search Result; Receiving an Indication of a Fourth User Interaction With the Second Search Result Element on the Fourth Search Result; Determining a Fourth Weight for the Second Search Result Element Based on the Fourth User Interaction With the Second Search Result Element on the Fourth Search Result; and Generating the Second User Interest Parameter Based on Summing the Third Weight and the Fourth Weight for the Second Search Result Element Continuing now with step 404, the second user interest parameter (not depicted) is generated as follows: First, an indication of a third user interaction with the second search result element 214 on the third search result 208 is received. For example, the user (not depicted) may highlight, select, or place the cursor over the phrase "Rebel Heart" (the second search result element 214) where it occurs in the third search result 208. Alternatively, the user may skip over the occurrence of this phrase in the third search result 208 altogether.

In some non-limiting implementations, the third user interaction comprises one or more of skipping the second search result element 214, fast scrolling past the second search result element 214, slow scrolling past the second search result element 214, stopping at the second search result element 214, highlighting the second search result element 214, and clicking on the second search result element 214.

Next, a third weight for the second search result element 214 based on the third user interaction with the second search result element 214 on the third search result 208 is determined. For example, suppose the user highlights the phrase "Rebel Heart" (the second search result element 214) in the third search result 208, where it occurs on the second line of the third search result 208, before the term "concert". In this case, the third weight is determined to be "+1", highlighting being a sign of user interest, the weight "+1" indicating the level of user interest. In contrast, suppose the user skipped over the phrase "Rebel Heart" (the second search result element 214) in the third search result 208. In that case, the third weight is determined to be "4", skipping over being an indicator of user disinterest.

Next, an indication of a fourth user interaction with the second search result element 214 on the fourth search result 210 is received. For example, the user (not depicted) may highlight, select, or place the cursor over the phrase "Rebel Heart" (the second search result element 214) where it occurs in the fourth search result 210. Alternatively, the user may skip over the occurrence of this phrase in the fourth search result 210 altogether.

In some non-limiting implementations, the fourth user interaction comprises one or more of skipping the second search result element 214, fast scrolling past the second search result element 214, slow scrolling past the second search result element 214, stopping at the second search result element 214, highlighting the second search result element 214, and clicking on the second search result element 214.

Next, a fourth weight for the second search result element 214 based on the fourth user interaction with the second search result element 214 on the fourth search result 210 is determined. For example, suppose the user highlights the phrase "Rebel Heart" (the second search result element 214) in the fourth search result 210, where it occurs in the middle of the third line of the fourth search result 210, before the term "tour". In this case, the fourth weight may be determined to be "+1", highlighting being a sign of user interest. In some non-limiting embodiments, the fourth weight in this case may be determined to be higher than "+1", e.g., "+2", to reflect the fact that the second search result element 214 is located in the middle of the third line in the fourth search result 210, the middle of the third line being a somewhat remote location and selection thereby indicating a strong user interest. It should be understood that the system for assessing and assigning weights to the second search result element 214 is not meant to be particularly limited and will vary depending on factors such as the algorithm used to determine the user interest parameter. The numerical values assigned to weights herein are provided for illustrative purposes only.

Finally, the second user interest parameter is generated based on summing the third weight and the fourth weight for the second search result element 214. For example, suppose the third weight is determined to be "+1" based on the third user interaction with the second search result element 214 on the third search result 208, and the fourth weight is determined to be "+2" based on the fourth user interaction with the second search result element 214 on the fourth search result 210. The second user interest parameter would then be +3 (the sum of +1 and +2), the second user interest parameter being a weighted accumulation of user interaction with the second search result element 214 on the third search result 208 and user interaction with the second search result element 214 on the fourth search result 210.

To give another example, suppose the third weight is determined to be "+1" based on the third user interaction with the second search result element 214 on the third search result 208, and the fourth weight is determined to be "−1" based on the fourth user interaction with the second search result element 214 on the fourth search result 210. The second user interest parameter would then be 0 (the sum of +1 and −1), the second user interest parameter being a weighted accumulation of user interaction with the second search result element 214 on the third search result 208 and user interaction with the second search result element 214 on the fourth search result 210.

In some non-limiting implementations, the second user interest parameter is generated in the form of a vector, $V_2(E_2, W_2)$, where $E_2$ denotes the second search result element 214 and $W_2$ denotes the sum of the third weight and the fourth weight, i.e., the summed weight for weights $w_{2,3}$, $w_{2,4} \ldots w_{2,n}$ for the first search result element, each of said weights $w_{2,3}, w_{2,4}, \ldots w_{2,n}$ being the nth weight determined for the second search result element 214 based on the nth user interaction with the second search result element 214 on the nth search result. Continuing with the examples described above, the second user interest parameter $V_2$ would be generated in the form of a vector $V_2$(Rebel Heart, +3) for the first example, and $V_2$(Rebel Heart, 0) for the second example. Other implementations are possible and implementation of the second user interest parameter is not meant to be particularly limited.

It should be noted that the number of search result elements and the number of corresponding user interest parameters generated is not particularly limited. The number of search result elements will depend on a number of factors, such as the nature and complexity of the search query, the type of search, the search query results set, and the like.

In some non-limiting implementations, search result elements are determined based on analysis of the search query results set on a SERP. For example, if the search query results set contains repeated use of a particular word, phrase, or text string, then that word, phrase, or text string may be selected as a search result element. As another example, if images are includes in the search query results set on a SERP, then each image may be selected as a search result element. As yet another example, words or phrases having clearly defined, distinct meanings (such as names) may be selected as search result elements. In still another example, a link (e.g., a web address), may be selected as a search result element. Thus, with reference to FIG. 2, although only two search result elements 212, 214 are identified for illustrative purposes, it should be understood that the screen shot depicted in FIG. 2 may include many additional search result elements (such as, without limitation, Madonna, American singer, fan club, Evita, www.madonna.com, Las Vegas, etc.).

Further, the number of search result elements included a particular search result is not particularly limited. For ease of understanding, the example shown in FIG. 2 depicts two search result elements 212, 214 that are included in separate search results (the first search result element 212 being included in the first search result 204 and the second search result 206, and the second search result element 214 being included in the third search result 208 and the fourth search result 210). However, it should be understood that two or more search result elements may be included in the same search result.

Similarly, the number of search results that include a particular search result element (and the number of corresponding weights determined for that particular search result element) is not particularly limited, and will vary depending on the search query result set.

Step 406—Including the Second Search Result Element and the Second User Interest Parameter in the Second Search Query At step 312 above, a second search query (not depicted) was generated, the second search query including the first search query 202 ("Madonna"), the first search result element 212 ("albums discography"), and the first user interest parameter (e.g., $V_1$(albums discography, +3)). In this way the first search query 202 was reformulated based at least in part on the significance of the first search result element 212, the significance of the first search result element 212 being determined by user interest therein as indicated by the first user interest parameter (e.g., $V_1$).

Continuing now with step 406, the second search query generated in step 312 is further refined to include the second search result element 214 and the second user interest parameter generated in step 404. In this way the reformulation of the first search query 202 is also based at least in part on the significance of the second search result element 214, the significance of the second search result element 214 being determined by user interest therein as indicated by the second user interest parameter (e.g., $V_2$). The second search query generated in step 406 is thus based at least in part on the significance of both the first search result element 212 and the second search result element 214.

The method 400 then continues with steps 314 and 316, as described above, using the second search query as refined in step 406.

Figure 5:
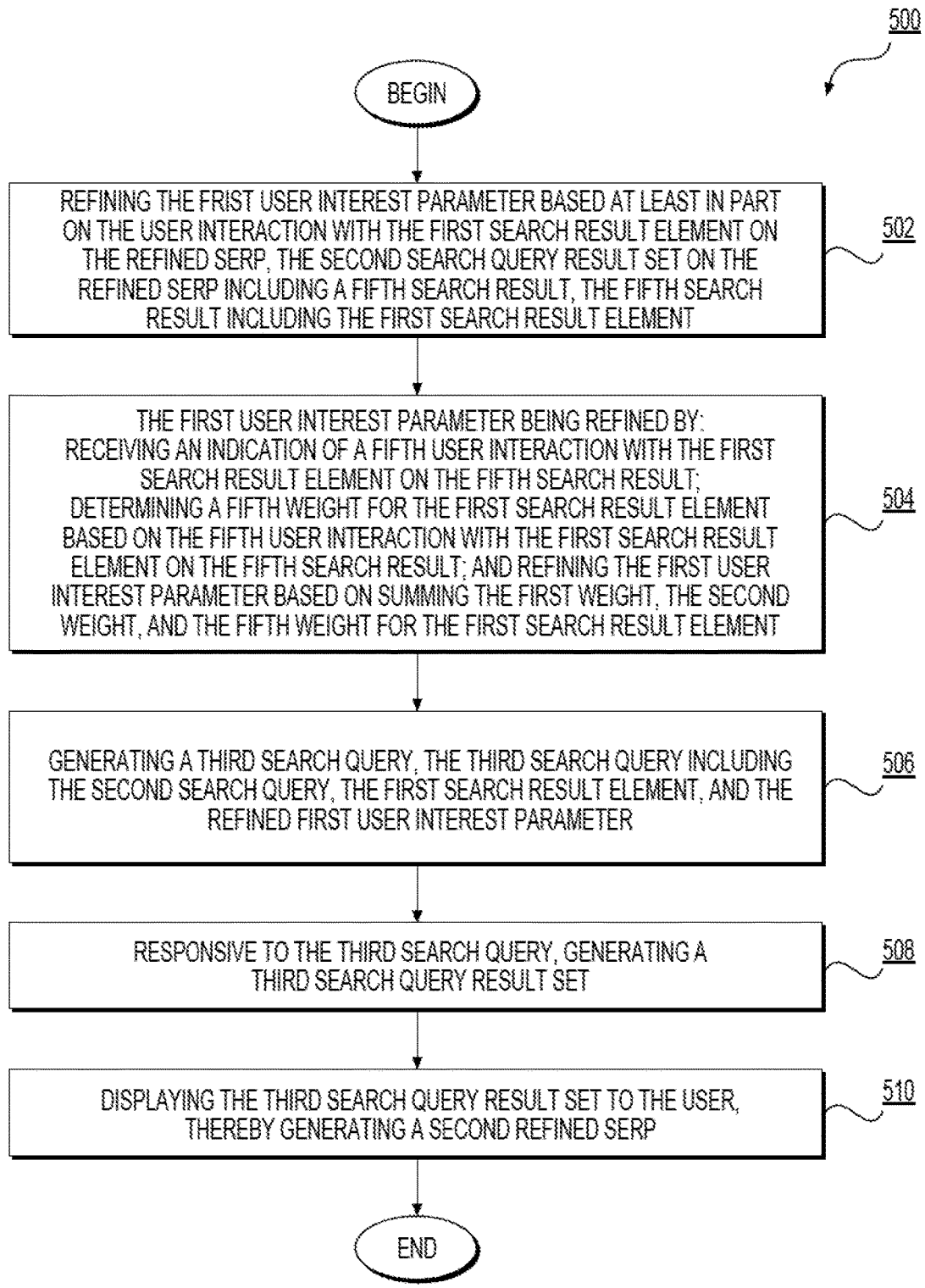
FIG. 5 depicts a block diagram of a method, the method being executable within the system of FIG. 1 and being implemented in accordance with non-limiting embodiments of the present technology.

Reference will now be made to FIG. 5, which depicts a block diagram of a method 500, the method 500 being implemented in accordance with other non-limiting embodiments of the present technology. The method 500 can be conveniently executed at server 116.

Like the method 400, the method 500 includes steps 302-316 and 402-406, as described above. For ease of understanding, steps 302-316 and 402-406 are not repeated here. The method 500 further comprises steps 502-510, which we will now describe.

Step 502—Refining the First User Interest Parameter Based at Least in Part on User Interaction With the First Search Result Element on the Refined SERP, the Second Search Query Result Set on the Refined SERP Including a Fifth Search Result, the Fifth Search Result Including the First Search Result Element The method 500 begins with step 502, in which the first user interest parameter is refined based at least in part on user interaction with the first search result element 212 on the refined SERP (not depicted). As described above with reference to step 316, the refined SERP includes the second search query result set (not depicted) generated in step 314 in response to the second search query (not depicted) generated in step 312. The second search query result set displayed on the refined SERP includes a fifth search result (not depicted), the fifth search result including the first search result element 212.

The fifth search result is not particularly limited. In some non-limiting implementations, the fifth search result may be the same as the first search result 204 or the second search result 206, both of which include the first search result element 212. For example, as discussed above, there may be overlap between the first and the second search query result sets, such that one or more of the search results 204, 206, 208, 210 are displayed again on the refined SERP.

In alternative non-limiting implementations, the fifth search result may be different from the first search result 2004 and the second search result 206. For example, the fifth search result may be a new search result generated in step 314 in response to the second search query, the fifth search result not having been previously generated in step 304 or previously displayed on the first SERP 108 in response to the first search query 202.

The method 500 now continues with step 504.

Step 504—the First User Interest Parameter Being Refined by: Receiving an Indication of a Fifth User Interaction With the First Search Result Element on the Fifth Search Result; Determining a Fifth Weight for the First Search Result Element Based on the Fifth User Interaction with the First Search Result Element on the Fifth Search Result; and Refining the First User Interest Parameter Based on Summing the First Weight, the Second Weight, and the Fifth Weight for the First Search Result Element At step 504 the first user interest parameter is refined based at least in part on user interaction with the first search result element 212 on the fifth search result (not depicted) on the refined SERP (not depicted). The refined first user interest parameter indicates user interest in the first search result element 212 and is a weighted accumulation of user interaction with the first search result element 212 on the first SERP 108 (i.e., on the first search result 204 and the second search result 206) and the refined SERP (i.e., on the fifth search result).

In some non-limiting implementations, the first user interest parameter is refined by the SERP refinement module 142.

The first user interest parameter is refined as follows: First, an indication of a fifth user interaction with the first search result element 212 on the fifth search result (not depicted) is received. As described above with reference to step 310, the user may for example highlight, select, or place the cursor over the phrase "albums discography" (the first search result element 212) where it occurs in the fifth search result. Alternatively, the user may skip over the occurrence of this phrase in the fifth search result altogether.

In some non-limiting implementations, the fifth user interaction comprises one or more of skipping the first search result element 212, fast scrolling past the first search result element 212, slow scrolling past the first search result element 212, stopping at the first search result element 212, highlighting the first search result element 212, and clicking on the first search result element 212.

Next, a fifth weight for the first search result element 212 based on the fifth user interaction with the first search result element 212 on the fifth search result is determined. The fifth weight is determined as described above with reference to the first weight, second weight, etc. based on user interaction with the first search result element 212 on the fifth search result. For the purposes of illustration, suppose the user skips over or scrolls quickly by the first search result element 212 on the fifth search result, and the fifth weight is determined to be "−1".

Finally, the first user interest parameter is refined based on summing the first weight, the second weight, and the fifth weight for the first search result element 212. For example, suppose the first user interest parameter was +3 based on the weighted accumulation of user interaction with the first search result element 212 on the first search result 204 and user interaction with the first search result element 212 on the second search result 206. The first user interest parameter is refined by adding the fifth weight of −1, generating a refined first user interest parameter of +2 (+3−1). The refined first user interest parameter is thus a weighted accumulation of user interaction with the first search result element 212 on both the first SERP 108 and the refined SERP.

The method 500 now continues with step 506.

Step 506—Generating a Third Search Query, the Third Search Query Including the Second Search Query, the First Search Result Element, and the Refined First User Interest Parameter At step 506, a third search query (not depicted) is generated. The third search query includes the second search query, the first search result element 212, and the refined user interest parameter that was generated in step 504. In this way the second search query is reformulated based at least in part on the significance of the first search result element 212, the significance of the first search result element 212 being determined by user interest therein on both the first SERP 108 and the refined SERP, as indicated by the refined first user interest parameter. The third search query is generated by reformulating the second search query accordingly.

The method 500 then continues with step 508.

Step 508—Responsive to the Third Search Query, Generating a Third Search Query Result Set At step 508, a third search query result set (not depicted) is generated in response to the third search query (not depicted). The server 116 generates a third search query result set in response to the third search query by accessing the search cluster 118. The third search query result set is not particularly limited. For example, it may include any number or type of search results. It may include general search results, vertical search results, or an aggregation thereof. The search results in the third search query result set are generally ranked according to general ranking procedures, as discussed above.

The third search query result set may or may not include one or more of the first search result 204, the second search result 206, the third search result 208, the fourth search result 210, and search results in the second search query result set. As will be understood by those skilled in the art, the third search query result set may or may not overlap with the first and second search query result sets, and the degree of overlap will vary considerably.

In some embodiments of the present technology, the third search query result set can be amended to remove search results that have already been displayed as part of the first or second search query result set (i.e., the first search result 204, the second search result 206, the third search result 208, and the fourth search result 210).

The method 500 now continues with step 510.

Step 510—Displaying the Third Search Query Result Set to the User, Thereby Generating a Second Refined SERP At step 510, the electronic device 102 associated with the user is caused to display the third search query result set (not depicted). Electronic device 102 associated with the user (not depicted) is coupled communicatively with the server 116 such that a second refined SERP (not depicted) including the third search query result set (not depicted) is displayed on the electronic device 102 in response to the third search query (not depicted) having been generated in step 506 and the third search query result set (not depicted) having been generated in step 508. The second refined SERP is a refined version of the refined SERP generated in step 316, in which the refined SERP has been further refined based at least in part on the significance of the first search result element 212 on the refined SERP, the significance of the first search result element 212 on the refined SERP being determined by user interest therein as indicated by the refined first user interest parameter.

The second refined SERP is not particularly limited. In particular, the number and type of search results and the arrangement of the search results on the second refined SERP will vary depending on numerous factors, such as the type of electronic device 102 associated with the user (not depicted), the nature of the third search query, user preferences, and the like. Search results displayed on the second refined SERP are generally ranked in accordance with standard ranking procedures, as described above. In some non-limiting implementations, the method 500 further comprises a step of determining that the search results in the third search query result set are relevant to the third search query, prior to ranking them relative to each other.

Although not depicted here, the method 500 may be repeated iteratively for each successive refined SERP displayed to the user on the electronic device 102. For example, the refined first user interest parameter may be further refined based at least in part on user interaction with the first search result element 212 on the second refined SERP, the second refined SERP including a further search result that includes the first search result element 212. Steps 502 to 510 can thus be repeated as many times as desired to provide the user with successively refined SERPs based on user interest as determined by user interaction with the first search result element 212 on each successive refined SERP.

Further, although steps 502 to 510 are described with reference to the first search result element 212, it should be understood that these steps may also be carried out, simultaneously or subsequently, with respect to the second user interest parameter and the second search result element 214. For example, the second user interest parameter may be refined based at least in part on user interaction with the second search result element 214 on the refined SERP. In this case, the second search query result set on the refined SERP may include a sixth search result (not depicted), the sixth search result including the second search result element 214. The sixth search result may or may not be the same as the third search result 208 and the fourth search result 210. The second user interest parameter may then be refined by: receiving an indication of a sixth user interaction with the second search result element 214 on the sixth search result; determining a sixth weight for the second search result element 214 based on the sixth user interaction with the second search result element 214 on the sixth search result; and refining the second user interest parameter based on summing the third weight, the fourth weight, and the sixth weight for the second search result element 214. The second search result element 214 and the refined second user interest parameter may then be included in the third search query, the second search query thereby being reformulated to indicate significance of the second search result element 214 on both the first SERP 108 and the refined SERP. As discussed above with reference to the first search result element 212, these steps may be repeated iteratively for each successive refined SERP displayed to the user on the electronic device 102. Steps 502 to 510 can be repeated as many times as desired to provide the user with successively refined SERPs based on user interest in the second search result element 214 as determined by user interaction with the second search result element 214 on each successive refined SERP.

Some technical effects of non-limiting embodiments of the present technology may include provision of refined search results that are relevant to the user, without the user having to submit additional search queries. Cumulative estimation of user interest in search result elements may also be provided, such that each successive refined SERP contains search results that are successively more relevant to the user than search results in the previous SERP. This refinement of search results can assist the user to delve more deeply into a subject of interest quickly. These provisions may further allow the user to find more efficiently the information he or she is looking for. Allowing the user to more efficiently find information may also result in less bandwidth usage. Also, with the electronic device 102 being implemented as a wireless communication device, ability to more efficiently find information would result in conservation of battery power of the electronic device 102. In some embodiments, the present technology may provide click efficiency, reducing the number of clicks required to locate relevant search results for a particular search query.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. In an illustrative embodiment, any of the operations, processes, etc. described herein may be implemented as computer-readable instructions stored on a non-transitory computer-readable storage medium. The computer-readable instructions may be executed by a processor of a mobile unit, a network element, and/or any other computing device, causing performance of the methods described herein. The scope of the present technology is therefore intended to be limited solely by the scope of the appended claims.

From one perspective, embodiments of the present technology described above can be summarized as follows, structured in numbered clauses:

CLAUSE 1. A method (300) of generating a refined search engine results page (SERP) for a first search query (202) received from a user, the method executable at a server (116), the method comprising:

a) receiving the first search query (202) from an electronic device (102) associated with the user;

b) responsive to the first search query (202), generating a first search query result set;

c) displaying the first search query result set to the user on a first SERP (108), the first search query result set including a first search result (204) and a second search result (206), both the first search result (204) and the second search result (206) including a first search result element (212);

d) based at least in part on user interaction with the first search result element (212) on the first SERP (108), generating a first user interest parameter for the first search result element (212), the first user interest parameter indicating user interest in the first search result element (212) and being a weighted accumulation of user interaction with the first search result element (212) on the first search result (204) and the second search result (206), the first user interest parameter being generated by: i) receiving an indication of a first user interaction with the first search result element (212) on the first search result (204); ii) determining a first weight for the first search result element (212) based on the first user interaction with the first search result element (212) on the first search result (204); iii) receiving an indication of a second user interaction with the first search result element (212) on the second search result (206); iv) determining a second weight for the first search result element (212) based on the second user interaction with the first search result element (212) on the second search result (206); and v) generating the first user interest parameter based on summing the first weight and the second weight for the first search result element (212);

e) generating a second search query, the second search query including the first search query (202), the first search result element (212), and the first user interest parameter as a reformulation of the first search query (202) indicating significance of the first search result element (212);

f) responsive to the second search query, generating a second search query result set; and g) displaying the second search query result set to the user, thereby generating the refined SERP.

CLAUSE 2. The method of clause 1, wherein the first search query result set further comprises a third search result (208) and a fourth search result (210), both the third search result (208) and the fourth search result (210) including a second search result element (214); the method further comprising the steps of:

based at least in part on user interaction with the second search result element (214) on the first SERP (108), generating a second user interest parameter for the second search result element (214) by:

receiving an indication of a third user interaction with the second search result element (214) on the third search result (208);

determining a third weight for the second search result element (214) based on the third user interaction with the second search result element (214) on the third search result (208);

receiving an indication of a fourth user interaction with the second search result element (214) on the fourth search result (210);

determining a fourth weight for the second search result element (214) based on the fourth user interaction with the second search result element (214) on the fourth search result (210); and generating the second user interest parameter based on summing the third weight and the fourth weight for the second search result element (214); and, including the second search result element (214) and the second user interest parameter in the second search query as the reformulation of the first search query (202) indicating significance of the second search result element (214).

CLAUSE 3. The method of clause 1 or 2, further comprising the steps of:

refining the first user interest parameter based at least in part on user interaction with the first search result element (212) on the refined SERP, the second search query result set on the refined SERP including a fifth search result, the fifth search result including the first search result element (212); the first user interest parameter being refined by:

receiving an indication of a fifth user interaction with the first search result element (212) on the fifth search result;

determining a fifth weight for the first search result element (212) based on the fifth user interaction with the first search result element (212) on the fifth search result; and refining the first user interest parameter based on summing the first weight, the second weight, and the fifth weight for the first search result element (212);

generating a third search query, the third search query including the second search query, the first search result element (212), and the refined first user interest parameter as a reformulation of the second search query indicating significance of the first search result element (212);

responsive to the third search query, generating a third search query result set; and displaying the third search query result set to the user, thereby generating a second refined SERP.

CLAUSE 4. The method of clause 3, further comprising the steps of:

refining the second user interest parameter based at least in part on user interaction with the second search result element (214) on the refined SERP, the second search query result set on the refined SERP including a sixth search result, the sixth search result including the second search result element (214); the second user interest parameter being refined by:

receiving an indication of a sixth user interaction with the second search result element (214) on the sixth search result;

determining a sixth weight for the second search result element (214) based on the sixth user interaction with the second search result element (214) on the sixth search result; and refining the second user interest parameter based on summing the third weight, the fourth weight, and the sixth weight for the second search result element (214); and, including the second search result element (214) and the refined second user interest parameter in the third search query as the reformulation of the second search query indicating significance of the second search result element (214).

CLAUSE 5. The method of any one of clauses 1 to 4, wherein the first search result element (212) comprises one or more of a word, a phrase, a link, and an image.

CLAUSE 6. The method of any one of clauses 2 to 5, wherein the second search result element (214) comprises one or more of a word, a phrase, a link, and an image.

CLAUSE 7. The method of any one of clauses 1 to 6, wherein said first user interaction and said second user interaction independently comprise one or more of skipping the first search result element (212), fast scrolling past the first search result element (212), slow scrolling past the first search result element (212), stopping at the first search result element (212), highlighting the first search result element (212), and clicking on the first search result element (212).

CLAUSE 8. The method of any one of clauses 2 to 7, wherein the first search result (204) and the third search result (208) are the same.

CLAUSE 9. The method of any one of clauses 2 to 8, wherein the second search result (206) and the fourth search result (210) are the same.

CLAUSE 10. The method of any one of clauses 3 to 9, wherein the fifth search result and the sixth search result are the same.

CLAUSE 11. The method of any one of clauses 1 to 10, wherein the first user interest parameter is generated in the form of a vector $V_1(E_1, W_1)$, where $E_1$ denotes the first search result element (212) and $W_1$ denotes the summed weight for weights $w_{1.1}, w_{1.2}, \ldots w_{1.n}$ for the first search result element (212), each of said weights $w_{1.1}, w_{1.2}, \ldots w_{1.n}$ being the nth weight determined for the first search result element (212) based on the nth user interaction with the first search result element (212) on the nth search result.

CLAUSE 12. The method of any one of clauses 2 to 11, wherein the second user interest parameter is generated in the form of a vector $V_2(E_2, W_2)$, where $E_2$ denotes the second search result element (214) and $W_2$ denotes the summed weight for weights $w_{2.1}, w_{2.2}, \ldots w_{2.n}$ for the second search result element (214), each of said weights $w_{2.1}, w_{2.2}, \ldots w_{2.n}$ being the nth weight determined for the second search result element (214) based on the nth user interaction with the second search result element (214) on the nth search result.

CLAUSE 13. A server (116) comprising:

a communication interface for communication with an electronic device (102) associated with a user via a communication network;

a memory storage;

a processor operationally connected with the communication interface and the memory storage, the processor configured to store objects, in association with the user, on the memory storage, the processor being further configured to:

a) receive a first search query (202) from an electronic device (102) associated with the user;

b) responsive to the first search query (202), generate a first search query result set;

c) display the first search query result set to the user on a first search engine results page (SERP) (108), the first search query result set including a first search result (204) and a second search result (206), both the first search result (204) and the second search result (206) including a first search result element (212);

d) based at least in part on user interaction with the first search result element (212) on the first SERP (108), generate a first user interest parameter for the first search result element (212), the first user interest parameter indicating user interest in the first search result element (212) and being a weighted accumulation of user interaction with the first search result element (212) on the first search result (204) and the second search result (206), the first user interest parameter being generated by: i) receiving an indication of a first user interaction with the first search result element (212) on the first search result (204); ii) determining a first weight for the first search result element (212) based on the first user interaction with the first search result element (212) on the first search result (204); iii) receiving an indication of a second user interaction with the first search result element (212) on the second search result (206); iv) determining a second weight for the first search result element (212) based on the second user interaction with the first search result element (212) on the second search result (206); and v) generating the first user interest parameter based on summing the first weight and the second weight for the first search result element (212);

e) generate a second search query, the second search query including the first search query (202), the first search result element (212), and the first user interest parameter as a reformulation of the first search query (202) indicating significance of the first search result element (212);

f) responsive to the second search query, generate a second search query result set; and g) display the second search query result set to the user, thereby generating a refined SERP.

CLAUSE 14. The server of clause 13, wherein the first search query result set further comprises a third search result (208) and a fourth search result (210), both the third search result (208) and the fourth search result (210) including a second search result element (214); the processor being further configured to:

based at least in part on user interaction with the second search result element (214) on the first SERP (108), generate a second user interest parameter for the second search result element (214) by:

receiving an indication of a third user interaction with the second search result element (214) on the third search result (208);

determining a third weight for the second search result element (214) based on the third user interaction with the second search result element (214) on the third search result (208);

receiving an indication of a fourth user interaction with the second search result element (214) on the fourth search result (210);

determining a fourth weight for the second search result element (214) based on the fourth user interaction with the second search result element (214) on the fourth search result (210); and generating the second user interest parameter based on summing the third weight and the fourth weight for the second search result element (214); and, include the second search result element (214) and the second user interest parameter in the second search query as the reformulation of the first search query (202) indicating significance of the second search result element (214).

CLAUSE 15. The server of clause 13 or 14, wherein the processor is further configured to:

refine the first user interest parameter based at least in part on user interaction with the first search result element (212) on the refined SERP, the second search query result set on the refined SERP including a fifth search result, the fifth search result including the first search result element (212); the first user interest parameter being refined by:

receiving an indication of a fifth user interaction with the first search result element (212) on the fifth search result;

determining a fifth weight for the first search result element (212) based on the fifth user interaction with the first search result element (212) on the fifth search result; and refining the first user interest parameter based on summing the first weight, the second weight, and the fifth weight for the first search result element (212);

generate a third search query, the third search query including the second search query, the first search result element (212), and the refined first user interest parameter as a reformulation of the second search query indicating significance of the first search result element (212);

responsive to the third search query, generate a third search query result set; and display the third search query result set to the user, thereby generating a second refined SERP.

CLAUSE 16. The server of clause 15, wherein the processor is further configured to:

refine the second user interest parameter based at least in part on user interaction with the second search result element (214) on the refined SERP, the second search query result set on the refined SERP including a sixth search result, the sixth search result including the second search result element (214); the second user interest parameter being refined by:

receiving an indication of a sixth user interaction with the second search result element (214) on the sixth search result;

determining a sixth weight for the second search result element (214) based on the sixth user interaction with the second search result element (214) on the sixth search result; and refining the second user interest parameter based on summing the third weight, the fourth weight, and the sixth weight for the second search result element (214); and, include the second search result element (214) and the refined second user interest parameter in the third search query as the reformulation of the second search query indicating significance of the second search result element (214).

CLAUSE 17. The server of any one of clauses 13 to 16, wherein the first search result element (212) comprises one or more of a word, a phrase, a link, and an image.

CLAUSE 18. The server of any one of clauses 14 to 17, wherein the second search result element (214) comprises one or more of a word, a phrase, a link, and an image.

CLAUSE 19. The server of any one of clauses 13 to 18, wherein said first user interaction and said second user interaction independently comprise one or more of skipping the first search result element (212), fast scrolling past the first search result element (212), slow scrolling past the first search result element (212), stopping at the first search result element (212), highlighting the first search result element (212), and clicking on the first search result element (212).

CLAUSE 20. The server of any one of clauses 14 to 19, wherein the first search result (204) and the third search result (208) are the same.

CLAUSE 21. The server of any one of clauses 14 to 20, wherein the second search result (206) and the fourth search result (210) are the same.

CLAUSE 22. The server of any one of clauses 15 to 21, wherein the fifth search result and the sixth search result are the same.

CLAUSE 23. The server of any one of clauses 13 to 22, wherein the first user interest parameter is generated in the form of a vector $V_1(E_1, W_1)$, where $E_1$ denotes the first search result element (212) and $W_1$ denotes the summed weight for weights $w_{1.1}, w_{1.2}, \ldots w_{1.n}$ for the first search result element (212), each of said weights $w_{1.1}, w_{1.2}, \ldots w_{1.n}$ being the nth weight determined for the first search result element (212) based on the nth user interaction with the first search result element (212) on the nth search result.

CLAUSE 24. The server of any one of clauses 14 to 23, wherein the second user interest parameter is generated in the form of a vector $V_2(E_2, W_2)$, where $E_2$ denotes the second search result element (214) and $W_2$ denotes the summed weight for weights $w_{2.1}, w_{2.2}, \ldots w_{2.n}$ for the second search result element (214), each of said weights $w_{2.1}, w_{2.2}, \ldots w_{2.n}$ being the nth weight determined for the second search result element (214) based on the nth user interaction with the second search result element (214) on the nth search result.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of generating a refined search engine results page (SERP) for a first search query received from a user, the method executable at a server, the method comprising:
 a) receiving the first search query from an electronic device associated with the user;
 b) responsive to the first search query, generating a first search query result set;
 c) displaying the first search query result set to the user on a first SERP, the first search query result set including a first search result and a second search result, both the first search result and the second search result including a first search result element, wherein:
  the first search result element comprises at least one of a word, a phrase, a link, and an image, and
  the first search result element is a common element of both the first search result and the second search result;
 d) based at least in part on user interaction with the first search result element on the first SERP, generating a first user interest parameter for the first search result element, the first user interest parameter indicating user interest in the first search result element, the first user interest parameter being generated by:
  i) receiving an indication of a first user interaction with the first search result element on the first search result;
  ii) determining a first weight for the first search result element based on the first user interaction with the first search result element on the first search result;

iii) receiving an indication of a second user interaction with the first search result element on the second search result;

iv) determining a second weight for the first search result element based on the second user interaction with the first search result element on the second search result; and v) generating the first user interest parameter based on summing the first weight and the second weight for the first search result element, the first user interest parameter being a weighted accumulation of the first user interaction with the first search result element on the first search result and the second user interaction with the first search result element on the second search result;

e) generating a second search query, the generating being based on reformulating the first search query, the reformulating being based at least on the first search result element and the first user interest parameter associated therewith, the first user interest parameter being indicative of significance of the first search result element;

f) responsive to the second search query, generating a second search query result set; and g) displaying the second search query result set to the user, thereby generating the refined SERP.

2. The method of claim 1, wherein the first search query result set further comprises a third search result and a fourth search result, both the third search result and the fourth search result including a second search result element;

the second search result element comprising at least one of a word, a phrase, a link, and an image;

the second search result element being a common element of both the third search result and the fourth search result;

the method further comprising the steps of:

based at least in part on user interaction with the second search result element on the first SERP, generating a second user interest parameter for the second search result element by:

receiving an indication of a third user interaction with the second search result element on the third search result;

determining a third weight for the second search result element based on the third user interaction with the second search result element on the third search result;

receiving an indication of a fourth user interaction with the second search result element on the fourth search result;

determining a fourth weight for the second search result element based on the fourth user interaction with the second search result element on the fourth search result; and generating the second user interest parameter based on summing the third weight and the fourth weight for the second search result element;

the second user interest parameter being a weighted accumulation of the third user interaction with the second search result element on the third search result and the fourth user interaction with the second search result element on the fourth search result;

using the second search result element and the second user interest parameter for generating the second search query by reformulating the first search query, the reformulating being based at least on one of the first search result element and the first user interest parameter associated therewith, the second search result element and the second user interest parameter associated therewith, the first user interest parameter and the second user interest parameter being indicative of significance of the first search result element and the second search result element, respectively.

3. The method of claim 1, further comprising the steps of:

refining the first user interest parameter based at least in part on user interaction with the first search result element on the refined SERP, the second search query result set on the refined SERP including a fifth search result, the fifth search result including the first search result element; the first user interest parameter being refined by:

receiving an indication of a fifth user interaction with the first search result element on the fifth search result;

determining a fifth weight for the first search result element based on the fifth user interaction with the first search result element on the fifth search result; and refining the first user interest parameter based on summing the first weight, the second weight, and the fifth weight for the first search result element;

the refined first user interest parameter being a weighted accumulation of the first user interaction with the first search result element on the first search result, the second user interaction with the first search result element on the second search result, and the fifth user interaction with the first search result element on the fifth search result;

generating a third search query, the generating being based on reformulating the second search query, the reformulating being based at least on the first search result element and the refined first user interest parameter associated therewith, the refined first user interest parameter being indicative of significance of the first search result element;

responsive to the third search query, generating a third search query result set; and displaying the third search query result set to the user, thereby generating a second refined SERP.

4. The method of claim 3, further comprising the steps of:

refining the second user interest parameter based at least in part on user interaction with the second search result element on the refined SERP, the second search query result set on the refined SERP including a sixth search result, the sixth search result including the second search result element; the second user interest parameter being refined by:

receiving an indication of a sixth user interaction with the second search result element on the sixth search result;

determining a sixth weight for the second search result element based on the sixth user interaction with the second search result element on the sixth search result; and refining the second user interest parameter based on summing the third weight, the fourth weight, and the sixth weight for the second search result element;

the refined second user interest parameter being a weighted accumulation of the third user interaction with the second search result element on the third search result, the fourth user interaction with second search result element on the fourth search result, and the sixth user interaction with the second search result element on the sixth search result;

using the second search result element and the refined second user interest parameter for generating the third search query by reformulating the second search query, the reformulating being based at least on one of the first search result element and the refined first user interest parameter associated therewith, the second search result element and the refined second user interest parameter associated therewith;

the refined first user interest parameter and the refined second user interest parameter being indicative of significance of the first search result element and the second search result element, respectively.

5. The method of claim 1, wherein said first user interaction and said second user interaction independently comprise one or more of skipping the first search result element, fast scrolling past the first search result element, slow scrolling past the first search result element, stopping at the first search result element, highlighting the first search result element, and clicking on the first search result element.

6. The method of claim 1, wherein the first user interest parameter is generated in the form of a vector $V_1(E_1, W_1)$, where $E_1$ denotes the first search result element and $W_1$ denotes the summed weight for weights $w_{1.1}, w_{1.2}, \ldots w_{1.n}$ for the first search result element, each of said weights $w_{1.1}, w_{1.2}, \ldots w_{1.n}$ being the nth weight determined for the first search result element based on the nth user interaction with the first search result element on the nth search result.

7. The method of claim 1, wherein the second user interest parameter is generated in the form of a vector $V_2(E_2, W_2)$, where $E_2$ denotes the second search result element and $W_2$ denotes the summed weight for weights $w_{2.1}, w_{2.2}, \ldots w_{2.n}$ for the second search result element, each of said weights $w_{2.1}, w_{2.2}, \ldots w_{2.n}$ being the nth weight determined for the second search result element based on the nth user interaction with the second search result element on the nth search result.

8. A server comprising:
a communication interface for communication with an electronic device associated with a user via a communication network;
a memory storage;
a processor operationally connected with the communication interface and the memory storage, the processor configured to store objects, in association with the user, on the memory storage, the processor being further configured to:
a) receive a first search query from an electronic device associated with the user;
b) responsive to the first search query, generate a first search query result set;
c) display the first search query result set to the user on a first search engine results page (SERP), the first search query result set including a first search result and a second search result, both the first search result and the second search result including a first search result element, wherein:
the first search result element comprises at least one of a word, a phrase, a link, and an image, and
the first search result element is a common element of both the first search result and the second search result;
d) based at least in part on user interaction with the first search result element on the first SERP, generating a first user interest parameter for the first search result element, the first user interest parameter indicating user interest in the first search result element, the first user interest parameter being generated by:
i) receiving an indication of a first user interaction with the first search result element on the first search result;
ii) determining a first weight for the first search result element based on the first user interaction with the first search result element on the first search result;
iii) receiving an indication of a second user interaction with the first search result element on the second search result;
iv) determining a second weight for the first search result element based on the second user interaction with the first search result element on the second search result; and
v) generating the first user interest parameter based on summing the first weight and the second weight for the first search result element;
the first user interest parameter being a weighted accumulation of the first user interaction with the first search result element on the first search result and the second user interaction with the first search result element on the second search result;
e) generate a second search query, the generation being based on reformulating the first search query, the reformulating being based at least on the first search result element and the first user interest parameter associated therewith, the first user interest parameter being indicative of significance of the first search result element;
f) responsive to the second search query, generate a second search query result set; and
g) display the second search query result set to the user, thereby generating a refined SERP.

9. The server of claim 8, wherein the first search query result set further comprises a third search result and a fourth search result, both the third search result and the fourth search result including a second search result element;
the second search result element comprising at least one of a word, a phrase, a link, and an image;
the second search result element being a common element of both the third search result and the fourth search result;
the processor being further configured to:
based at least in part on user interaction with the second search result element on the first SERP, generate a second user interest parameter for the second search result element by:
receiving an indication of a third user interaction with the second search result element on the third search result;
determining a third weight for the second search result element based on the third user interaction with the second search result element on the third search result;
receiving an indication of a fourth user interaction with the second search result element on the fourth search result;
determining a fourth weight for the second search result element based on the fourth user interaction with the second search result element on the fourth search result;
generating the second user interest parameter based on summing the third weight and the fourth weight for the second search result element;

the second user interest parameter being a weighted accumulation of the third user interaction with the second search result element on the third search result and the fourth user interaction with the second search result element on the fourth search result;

using the second search result element and the second user interest parameter for generating the second search query by reformulating the first search query, the reformulating being based at least on one of the first search result element and the first user interest parameter associated therewith, the second search result element and the second user interest parameter associated therewith;

the first user interest parameter and the second user interest parameter being indicative of significance of the first search result element and the second search result element, respectively.

10. The server of claim 8, wherein the processor is further configured to:

refine the first user interest parameter based at least in part on user interaction with the first search result element on the refined SERP, the second search query result set on the refined SERP including a fifth search result, the fifth search result including the first search result element; the first user interest parameter being refined by:
 receiving an indication of a fifth user interaction with the first search result element on the fifth search result;
 determining a fifth weight for the first search result element based on the fifth user interaction with the first search result element on the fifth search result; and
 refining the first user interest parameter based on summing the first weight, the second weight, and the fifth weight for the first search result element;
  the refined first user interest parameter being a weighted accumulation of the first user interaction with the first search result element on the first search result, the second user interaction with the first search result element on the second search result, and the fifth user interaction with the first search result element on the fifth search result;

generate a third search query, the generation being based on reformulating the second search query, the reformulating being based at least on the first search result element and the refined first user interest parameter associated therewith, the refined first user interest parameter being indicative of significance of the first search result element;

responsive to the third search query, generate a third search query result set; and display the third search query result set to the user, thereby generating a second refined SERP.

11. The server of claim 10, wherein the processor is further configured to:

refine the second user interest parameter based at least in part on user interaction with the second search result element on the refined SERP, the second search query result set on the refined SERP including a sixth search result, the sixth search result including the second search result element; the second user interest parameter being refined by:
 receiving an indication of a sixth user interaction with the second search result element on the sixth search result;
 determining a sixth weight for the second search result element based on the sixth user interaction with the second search result element on the sixth search result; and
 refining the second user interest parameter based on summing the third weight, the fourth weight, and the sixth weight for the second search result element;
  the refined second user interest parameter being a weighted accumulation of the third user interaction with the second search result element on the third search result, the fourth user interaction with the second search result element on the fourth search result, and the sixth user interaction with the second search result element on the sixth search result;

use the second search result element and the refined second user interest parameter for generating the third search query by reformulating the second search query, the reformulating being based at least on one of the first search result element and the refined first user interest parameter associated therewith, the second search result element and the refined second user interest parameter associated therewith;

the refined first user interest parameter and the refined second user interest parameter being indicative of significance of the first search result element and the second search result element, respectively.

12. The server claim 8, wherein said first user interaction and said second user interaction independently comprise one or more of skipping the first search result element, fast scrolling past the first search result element, slow scrolling past the first search result element, stopping at the first search result element, highlighting the first search result element, and clicking on the first search result element.

13. The server of claim 8, wherein the first user interest parameter is generated in the form of a vector $V_1(E_1, W_1)$, where $E_1$ denotes the first search result element and $W_1$ denotes the summed weight for weights $w_{1.1}, w_{1.2}, \ldots w_{1.n}$ for the first search result element, each of said weights $w_{1.1}, w_{1.2}, \ldots w_{1.n}$ being the nth weight determined for the first search result element based on the nth user interaction with the first search result element on the nth search result.

14. The server of claim 9, wherein the second user interest parameter is generated in the form of a vector $V_2(E_2, W_2)$, where $E_2$ denotes the second search result element and $W_2$ denotes the summed weight for weights $w_{2.1}, w_{2.2}, \ldots w_{2.n}$ for the second search result element, each of said weights $w_{2.1}, w_{2.2}, \ldots w_{2.n}$ being the nth weight determined for the second search result element based on the nth user interaction with the second search result element on the nth search result.

* * * * *